(12) United States Patent
Park et al.

(10) Patent No.: US 11,970,807 B2
(45) Date of Patent: Apr. 30, 2024

(54) DRAIN PUMP DRIVING APPARATUS AND LAUNDRY TREATMENT MACHINE INCLUDING THE SAME

(71) Applicant: LG ELECTRONICS INC., Seoul (KR)

(72) Inventors: Junho Park, Seoul (KR); Kiwook Lee, Seoul (KR); Jongseok Jung, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 499 days.

(21) Appl. No.: 17/258,121

(22) PCT Filed: Jul. 5, 2019

(86) PCT No.: PCT/KR2019/008289
§ 371 (c)(1),
(2) Date: Jan. 5, 2021

(87) PCT Pub. No.: WO2020/009531
PCT Pub. Date: Jan. 9, 2020

(65) Prior Publication Data
US 2021/0277562 A1 Sep. 9, 2021

(30) Foreign Application Priority Data
Jul. 6, 2018 (KR) .................. 10-2018-0079049

(51) Int. Cl.
*D06F 33/42* (2020.01)
*D06F 23/04* (2006.01)
(Continued)

(52) U.S. Cl.
CPC .............. *D06F 33/42* (2020.02); *D06F 23/04* (2013.01); *D06F 33/47* (2020.02); *D06F 34/10* (2020.02);
(Continued)

(58) Field of Classification Search
CPC .......... D06F 33/42; D06F 33/47; D06F 33/62; D06F 33/74; D06F 39/082; D06F 39/085;
(Continued)

(56) References Cited

U.S. PATENT DOCUMENTS

| | | | |
|---|---|---|---|
| 5,234,319 A * | 8/1993 | Wilder .................. | F04B 49/065 417/40 |
| 2004/0104158 A1* | 6/2004 | Kim ...................... | D06F 39/085 210/295 |

(Continued)

FOREIGN PATENT DOCUMENTS

| | | | | |
|---|---|---|---|---|
| EP | 2781640 A1 * | 9/2014 | ............. | D06F 33/02 |
| JP | 2001-276485 | 10/2001 | | |

(Continued)

OTHER PUBLICATIONS

International Search Report (with English Translation) dated Nov. 6, 2019 issued in Application No. PCT/KR2019/008289.

(Continued)

*Primary Examiner* — David G Cormier
(74) *Attorney, Agent, or Firm* — KED & ASSOCIATES, LLP

(57) ABSTRACT

The present disclosure relates to a drain pump driving apparatus and a laundry treatment machine including the same. A drain pump driving apparatus according to an embodiment of the present disclosure and a laundry treatment machine including the same include: an inverter converting a direct current (DC) voltage from a converter into an alternating current (AC) voltage based on a switching operation and to output the converted AC voltage to a drain motor; and a controller to control the motor to, when a drain channel in a drain pump is clogged, be temporarily stopped in a period during which a speed of the motor increases and then to repeatedly rotate and stop in a first direction the same as a start-up direction, and to repeatedly rotate and stop in (Continued)

a second direction opposite to the first direction when the drain channel is clogged even after the motor repeatedly rotates and stops in the first direction. Accordingly, when impurities are introduced into the drain pump, the impurities can be removed in a simple manner.

14 Claims, 18 Drawing Sheets

(51) Int. Cl.
| | | |
|---|---|---|
| *D06F 33/47* | (2020.01) | |
| *D06F 34/10* | (2020.01) | |
| *D06F 37/30* | (2020.01) | |
| *D06F 39/08* | (2006.01) | |
| *E03C 1/30* | (2006.01) | |
| *F04D 13/06* | (2006.01) | |
| *F04D 15/00* | (2006.01) | |
| *F04D 15/02* | (2006.01) | |
| *H02P 27/08* | (2006.01) | |
| *D06F 103/14* | (2020.01) | |
| *D06F 103/42* | (2020.01) | |
| *D06F 105/08* | (2020.01) | |
| *D06F 105/46* | (2020.01) | |
| *H02M 7/5387* | (2007.01) | |

(52) U.S. Cl.
CPC ............ *D06F 37/30* (2013.01); *D06F 37/304* (2013.01); *D06F 39/08* (2013.01); *D06F 39/085* (2013.01); *E03C 1/30* (2013.01); *F04D 13/06* (2013.01); *F04D 15/0066* (2013.01); *F04D 15/0245* (2013.01); *H02P 27/08* (2013.01); *D06F 2103/14* (2020.02); *D06F 2103/42* (2020.02); *D06F 2105/08* (2020.02); *D06F 2105/46* (2020.02); *H02M 7/53871* (2013.01)

(58) Field of Classification Search
CPC ............ D06F 2103/42; D06F 2103/48; D06F 2105/06; D06F 2105/08; A47L 15/001; A47L 2401/08; A47L 2501/05
See application file for complete search history.

(56) References Cited

U.S. PATENT DOCUMENTS

| | | | |
|---|---|---|---|
| 2007/0113595 A1* | 5/2007 | Harwood | .............. D06F 39/087 68/12.01 |
| 2007/0181156 A1* | 8/2007 | Uz | ...................... A47L 15/0049 134/109 |
| 2016/0115632 A1 | 4/2016 | Jung et al. | |
| 2017/0302208 A1 | 10/2017 | Je et al. | |

FOREIGN PATENT DOCUMENTS

| | | |
|---|---|---|
| JP | 2002-166090 | 6/2002 |
| JP | 2013-256926 | 12/2013 |
| KR | 20-1998-0019387 | 7/1998 |
| KR | 10-2011-0112486 | 10/2011 |
| KR | 10-2016-0049367 | 5/2016 |
| KR | 10-1756408 | 7/2017 |

OTHER PUBLICATIONS

Written Opinion dated Nov. 6, 2019 issued in Application No. PCT/KR2019/008289.

\* cited by examiner

DRAIN PUMP DRIVING APPARATUS AND LAUNDRY TREATMENT MACHINE INCLUDING THE SAME

CROSS-REFERENCE TO RELATED PATENT APPLICATIONS

This application is a U.S. National Stage Application under 35 U.S.C. § 371 of PCT Application No. PCT/KR2019/008289, filed Jul. 5, 2019, which claims priority to Korean Patent Application No. 10-2018-0079049, filed Jul. 6, 2018, whose entire disclosures are hereby incorporated by reference.

BACKGROUND OF THE DISCLOSURE

1. Field of the Disclosure

The present disclosure relates to a drain pump driving apparatus and a laundry treatment machine including the same, and more particularly, to a drain pump driving apparatus capable of removing impurities in a simple manner when the impurities are introduced into a drain pump, and a laundry treatment machine including the same.

Further, the present disclosure relates to a drain pump driving apparatus capable of smoothly performing drainage during dewatering, and a laundry treatment machine including the same.

Further, the present disclosure relates to a drain pump driving apparatus capable of reducing noise or vibration when a drain pump operates, and a laundry treatment machine including the same.

Further, the present disclosure relates to a drain pump driving apparatus capable of driving a drain pump motor in a sensorless manner, and a laundry treatment machine including the same.

Further, the present disclosure relates to a drain pump driving apparatus capable of improving the stability of a converter, and a laundry treatment machine including the same.

Further, the present disclosure relates to a drain pump driving apparatus capable of shortening a required time for completion of drainage, and a laundry treatment machine including the same.

2. Description of the Related Art

A drain pump driving apparatus drains water entering a water introduction part by driving a motor during drainage.

When using an AC pump motor in order to drive a drain pump, the motor is normally driven by a constant speed operation with an input AC voltage.

For example, when the frequency of the input AC voltage is 50 Hz, the drain pump motor rotates at 3,000 rpm, and, when the frequency of the input AC voltage is 60 Hz, the drain pump motor rotates at 3,600 rpm.

Such an AC pump motor has a drawback such as an extended period of time for completion of drainage because the speed of the motor is not controlled during drainage.

In order to address the drawback, researches are being conducted to apply a DC brushless motor as a drain pump motor.

Examples of a drain pump motor based on a DC brushless motor are disclosed in Japanese Patent Application Laid-Open Nos. 2001-276485 and 2002-166090.

In the prior documents, there is a drawback such as an extended period of time for completion of drainage during drainage because speed control is performed when the drain pump motor is controlled.

In addition, these prior documents merely disclose that the speed control is performed when the drain pump motor is controlled, without disclosing a solution capable of removing impurities when the impurities are introduced into the drain pump.

SUMMARY

The present disclosure provides a drain pump driving apparatus capable of removing impurities in a simple manner when the impurities are introduced into a drain pump, and a laundry treatment machine including the same.

Further, the present disclosure provides a drain pump driving apparatus capable of smoothly performing drainage during dewatering, and a laundry treatment machine including the same.

Further, the present disclosure provides a drain pump driving apparatus capable of reducing noise or vibration when a drain pump operates, and a laundry treatment machine including the same.

Further, the present disclosure provides a drain pump driving apparatus capable of driving a drain pump motor in a sensorless manner, and a laundry treatment machine including the same.

Further, the present disclosure provides a drain pump driving apparatus capable of improving the stability of a converter, and a laundry treatment machine including the same.

Further, the present disclosure provides a drain pump driving apparatus capable of shortening a required time for completion of drainage, and a laundry treatment machine including the same.

An embodiment of the present disclosure provides a drain pump driving apparatus and a laundry treatment machine including the same, the drain pump driving apparatus including: an inverter converting a direct current (DC) voltage from a converter into an alternating current (AC) voltage based on a switching operation and to output the converted AC voltage to a drain motor; and a controller to control the motor to, when a drain channel in a drain pump is clogged, be temporarily stopped in a period during which a speed of the motor increases and then to repeatedly rotate and stop in a first direction the same as a start-up direction, and to repeatedly rotate and stop in a second direction opposite to the first direction when the drain channel is clogged even after the motor repeatedly rotates and stops in the first direction.

In the drain pump driving apparatus and the laundry treatment machine including the same according to the embodiment of the present disclosure, when the clogged drain channel is unclogged during the repeated rotation and stop of the motor in the first direction, the controller may increase the speed of the motor in the first direction without rotating and stopping the motor in the second direction.

In the drain pump driving apparatus and the laundry treatment machine including the same according to the embodiment of the present disclosure, when the clogged drain channel is unclogged during the repeated rotation and stop of the motor in the second direction, the controller may increase the speed of the motor by rotating the motor in the first direction.

In the drain pump driving apparatus and the laundry treatment machine including the same according to the embodiment of the present disclosure, the controller may control the motor to differentiate a power consumed by the motor when the motor rotates and stops in the first direction from a power consumed by the motor when the motor rotates and stops in the second direction.

In the drain pump driving apparatus and the laundry treatment machine including the same according to the embodiment of the present disclosure, when the drain channel is clogged even after the motor repeatedly rotates and stops in the second direction, the controller may control the motor to repeatedly rotate and stop in the first direction.

In the drain pump driving apparatus and the laundry treatment machine including the same according to the embodiment of the present disclosure, the controller may control the motor such that a level of a current flowing in the motor when the motor rotates in the first direction is greater than a level of a current flowing in the motor when the motor rotates in the second direction.

In the drain pump driving apparatus and the laundry treatment machine including the same according to the embodiment of the present disclosure, the controller may control the motor such that, in a state where a level of a rotation speed in the first direction is the same as a level of a rotation speed in the second direction, a level of a current flowing in the motor when the motor rotates in the first direction is greater than a level of a current flowing in the motor when the motor rotates in the second direction.

In the drain pump driving apparatus and the laundry treatment machine including the same according to the embodiment of the present disclosure, when a start-up failure occurs, the controller may control the motor to change a rotation direction of the motor.

In the drain pump driving apparatus and the laundry treatment machine including the same according to the embodiment of the present disclosure, in the period during which the speed of the motor increases, when a start-up failure occurs, the controller may control the motor to be repeatedly turned on and off in the first direction in a first number of times, and to be repeatedly turned on and off in the second direction opposite to the first direction in a second number of times by changing a rotation direction of the motor.

In the drain pump driving apparatus and the laundry treatment machine including the same according to the embodiment of the present disclosure, after changing the rotation direction, even when the start-up failure does not occur, the controller may control the motor to change the rotation direction of the motor again.

In the drain pump driving apparatus and the laundry treatment machine including the same according to the embodiment of the present disclosure, during drainage, in the period during which the speed of the motor increases, if a predetermined period of time elapses in a state where a current speed of the motor does not reach a target speed, the controller may control the motor to change a rotation direction of the motor.

Advantageous Effects

According to an embodiment of the present disclosure, there are provided a drain pump driving apparatus and a laundry treatment machine including the same, the drain pump driving apparatus including: an inverter converting a direct current (DC) voltage from a converter into an alternating current (AC) voltage based on a switching operation and to output the converted AC voltage to a drain motor; and a controller to control the motor to, when a drain channel in a drain pump is clogged, be temporarily stopped in a period during which a speed of the motor increases and then to repeatedly rotate and stop in a first direction the same as a start-up direction, and to repeatedly rotate and stop in a second direction opposite to the first direction when the drain channel is clogged even after the motor repeatedly rotate and stop in the first direction. Accordingly, when impurities are introduced into the drain pump, the impurities can be removed in a simple manner.

In the drain pump driving apparatus and the laundry treatment machine including the same according to the embodiment of the present disclosure, when the clogged drain channel is unclogged during the repeated rotation and stop of the motor in the first direction, the controller may increase the speed of the motor in the first direction without rotating and stopping the motor in the second direction. Accordingly, when impurities are introduced into the drain pump, the impurities can be removed in a simple manner.

In the drain pump driving apparatus and the laundry treatment machine including the same according to the embodiment of the present disclosure, when the clogged drain channel is unclogged during the repeated rotation and stop of the motor in the second direction, the controller may increase the speed of the motor by rotating the motor in the first direction. Accordingly, when impurities are introduced into the drain pump, the impurities can be removed in a simple manner.

In the drain pump driving apparatus and the laundry treatment machine including the same according to the embodiment of the present disclosure, the controller may control the motor to differentiate a power consumed by the motor when the motor rotates and stops in the first direction from a power consumed by the motor when the motor rotates and stops in the second direction. Accordingly, the stability of the converter can be improved as well as removal of impurities when the impurities are introduced into the drain pump.

In the drain pump driving apparatus and the laundry treatment machine including the same according to the embodiment of the present disclosure, when the drain channel is clogged even after the motor repeatedly rotates and stops in the second direction, the controller may control the motor to repeatedly rotate and stop in the first direction. Accordingly, when impurities are introduced into the drain pump, the impurities can be removed in a simple manner.

In the drain pump driving apparatus and the laundry treatment machine including the same according to the embodiment of the present disclosure, the controller may control the motor such that a level of a current flowing in the motor when the motor rotates in the first direction is greater than a level of a current flowing in the motor when the motor rotates in the second direction. Accordingly, the stability of the converter 410 can be improved as well as removal of impurities when the impurities are introduced into the drain pump.

In the drain pump driving apparatus and the laundry treatment machine including the same according to the embodiment of the present disclosure, the controller may control the motor such that, in a state where a level of a rotation speed in the first direction is the same as a level of a rotation speed in the second direction, a level of a current flowing in the motor when the motor rotates in the first direction is greater than a level of a current flowing in the motor when the motor rotates in the second direction. Accordingly, the stability of the converter 410 can be improved as well as removal of impurities when the impurities are introduced into the drain pump.

In the drain pump driving apparatus and the laundry treatment machine including the same according to the embodiment of the present disclosure, when a start-up failure occurs, the controller may control the motor to change a rotation direction of the motor. Accordingly, when impurities are introduced into the drain pump, the impurities can be removed in a simple manner.

In the drain pump driving apparatus and the laundry treatment machine including the same according to the embodiment of the present disclosure, in the period during which the speed of the motor increases, when a start-up failure occurs, the controller may control the motor to be repeatedly turned on and off in the first direction in a first number of times, and to be repeatedly turned on and off in the second direction opposite to the first direction in a second number of times by changing a rotation direction of the motor. Accordingly, when impurities are introduced into the drain pump, the impurities can be removed in a simple manner.

In the drain pump driving apparatus and the laundry treatment machine including the same according to the embodiment of the present disclosure, after changing the rotation direction, even when the start-up failure does not occur, the controller may control the motor to change the rotation direction of the motor again. Accordingly, when impurities are introduced into the drain pump, the impurities can be removed in a simple manner.

In the drain pump driving apparatus and the laundry treatment machine including the same according to the embodiment of the present disclosure, during drainage, in the period during which the speed of the motor increases, if a predetermined period of time elapses in a state where a current speed of the motor does not reach a target speed, the controller may control the motor to change a rotation direction of the motor.

BRIEF DESCRIPTION OF THE DRAWINGS

The above and other objects, features and other advantages of the present disclosure will be more clearly understood from the following detailed description taken in conjunction with the accompanying drawings, in which.

DETAILED DESCRIPTION OF THE PREFERRED EMBODIMENTS

Reference will now be made in detail to the preferred embodiments of the present disclosure, examples of which are illustrated in the accompanying drawings. Wherever possible, the same reference numbers will be used throughout the drawings to refer to the same or like parts.

As used herein, the suffixes "module" and "unit" are added or used interchangeably to facilitate preparation of this specification and are not intended to suggest distinct meanings or functions. Accordingly, the terms "module" and "unit" may be used interchangeably.

Figure 1:
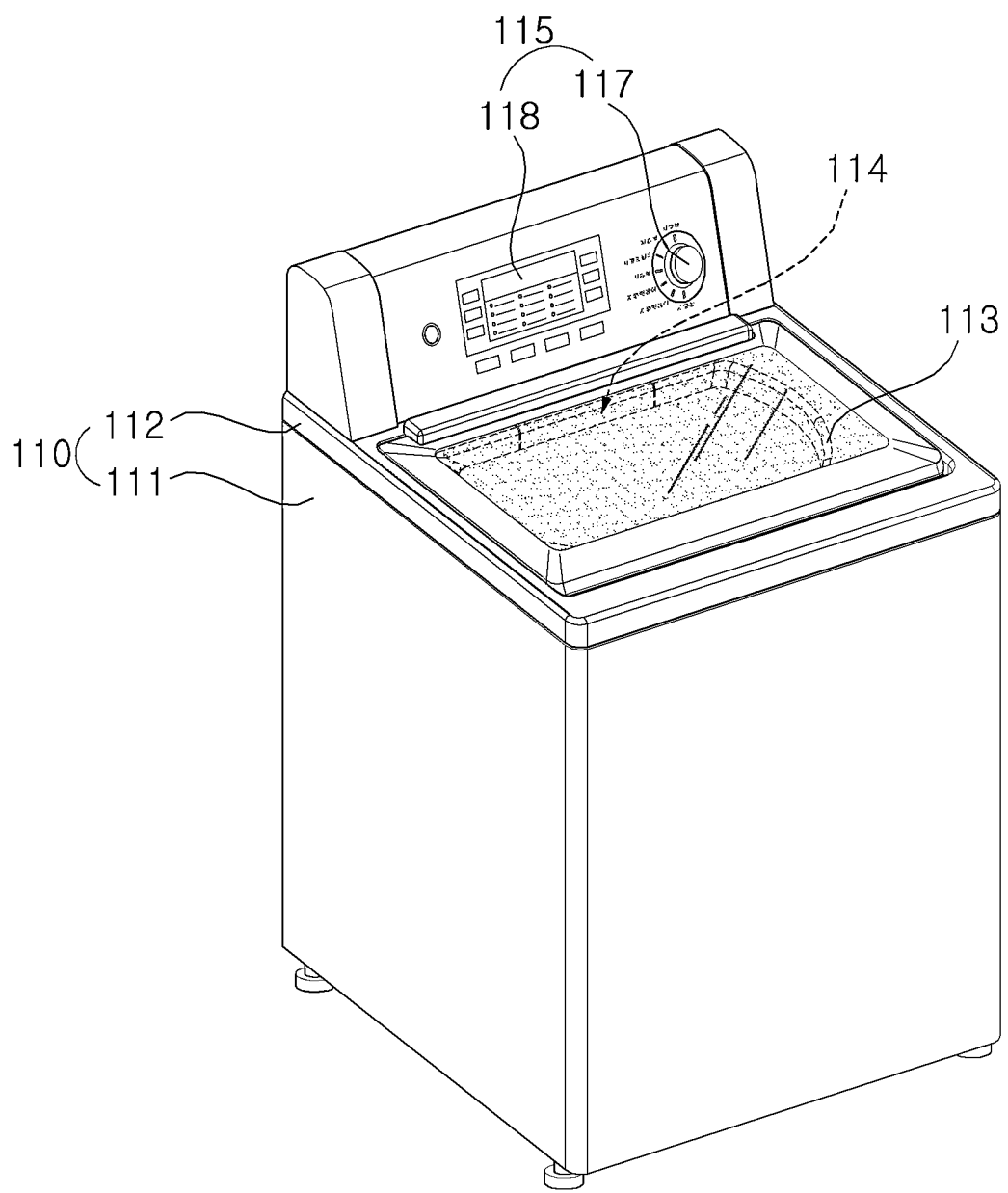
FIG. 1 is a perspective view illustrating a laundry treatment machine according to an embodiment of the present disclosure.
Figure 2:
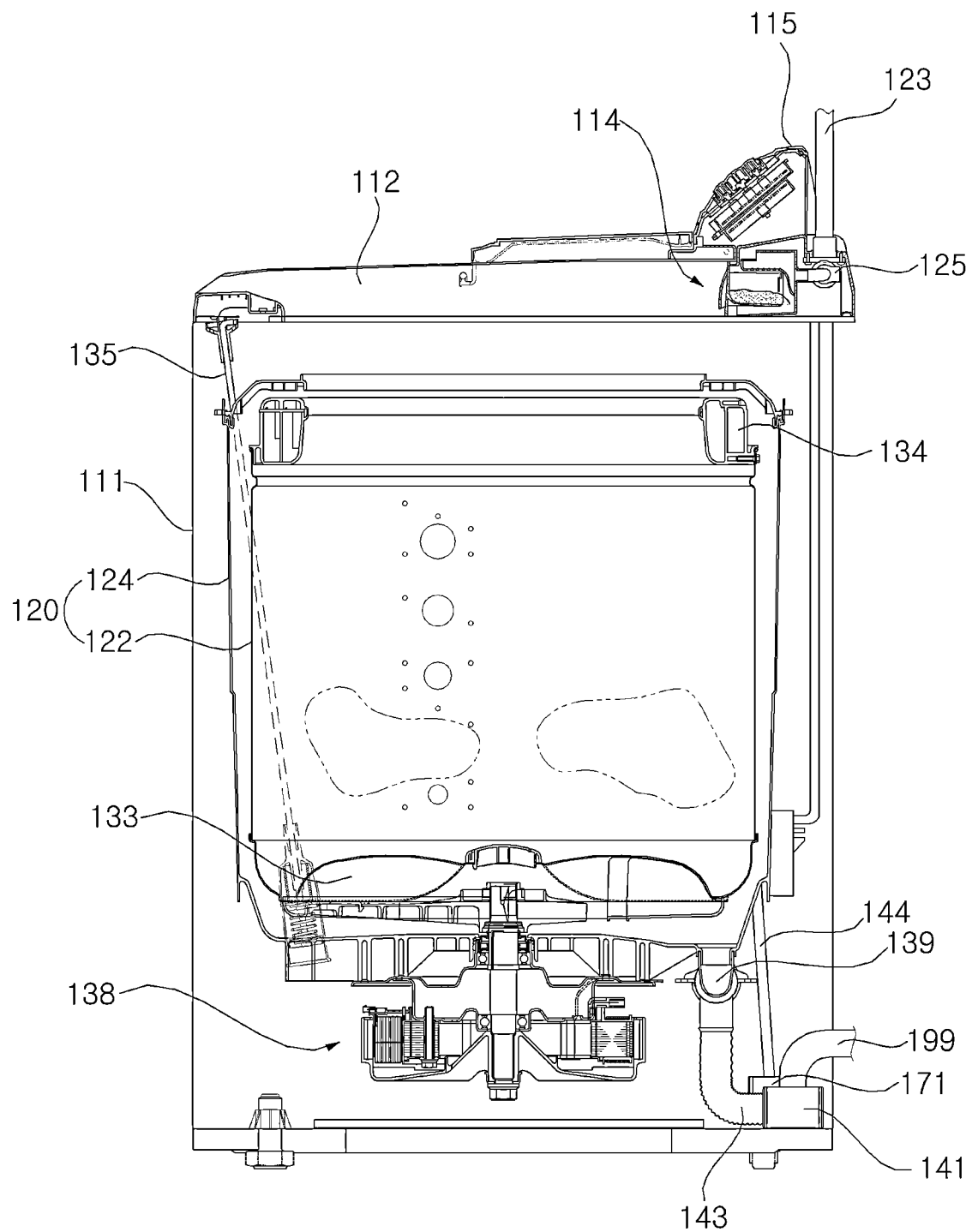
FIG. 2 is a side cross-sectional view of the laundry treatment machine of FIG. 1.

FIG. 1 is a perspective view illustrating a laundry treatment machine according to an embodiment of the present disclosure, and FIG. 2 is a side cross-sectional view illustrating the laundry treatment machine of FIG. 1.

Referring to FIGS. 1 and 2, the laundry treatment machine 100 according to an embodiment of the present disclosure conceptually includes a washing machine having fabric inserted therein for performing washing, rinsing and dewatering, or a dryer having wet fabric inserted therein. The washing machine will be mainly described below.

The washing machine 100 includes a casing 110 forming an outer appearance, operation keys for receiving various control commands from a user, and a control panel 115 equipped with a display for displaying information on the operating state of the washing machine 100 to provide a user interface, and a door 113 rotatably installed in the casing 110 to open and close an entrance hole through which the laundry enters and exits.

The casing 110 includes a body 111 for defining a space in which various components of the washing machine 100 can be accommodated and a top cover 112 provided at an upper side of the body 111 and forming a fabric entrance hole to allow the laundry to be introduced into an inner tub 122 therethrough.

The casing 110 is described as including the body 111 and the top cover 112, but the casing 110 is not limited thereto as long as it forms the appearance of the washing machine 100.

A support rod 135 is coupled to the top cover 112 which is one of the constituent elements of the casing 110. However, the support rod 135 is not limited thereto and may be coupled to any part of the fixed portion of the casing 110.

The control panel 115 includes operation keys 117 for controlling an operation state of the laundry treatment machine 100 and a display 118 disposed on one side of the operation keys 117 to display the operation state of the laundry treatment machine 100.

The door 113 opens and closes a fabric entrance hole (not shown) formed in the top cover 112 and may include a transparent member such as reinforced glass to allow the inside of the body 111 to be seen.

The washing machine 100 may include a washing tub 120. The washing tub 120 may include an outer tub 124 containing wash water and an inner tub 122 rotatably installed in the outer tub 124 to accommodate laundry. A balancer 134 may be provided at the upper portion of the washing tub 120 to compensate for unbalance amount generated when the washing tub 120 rotates.

Meanwhile, the washing machine 100 may include a pulsator 133 rotatably provided at a lower portion of the washing tub 120.

The driving apparatus 138 serves to provide a driving force for rotating the inner tub 122 and/or the pulsator 133. A clutch (not shown) for selectively transmitting the driving force of the driving apparatus 138 may be provided such that only the inner tub 122 is rotated, only the pulsator 133 is rotated, or the inner tub 122 and the pulsator 133 are rotated at the same time.

Figure 3:
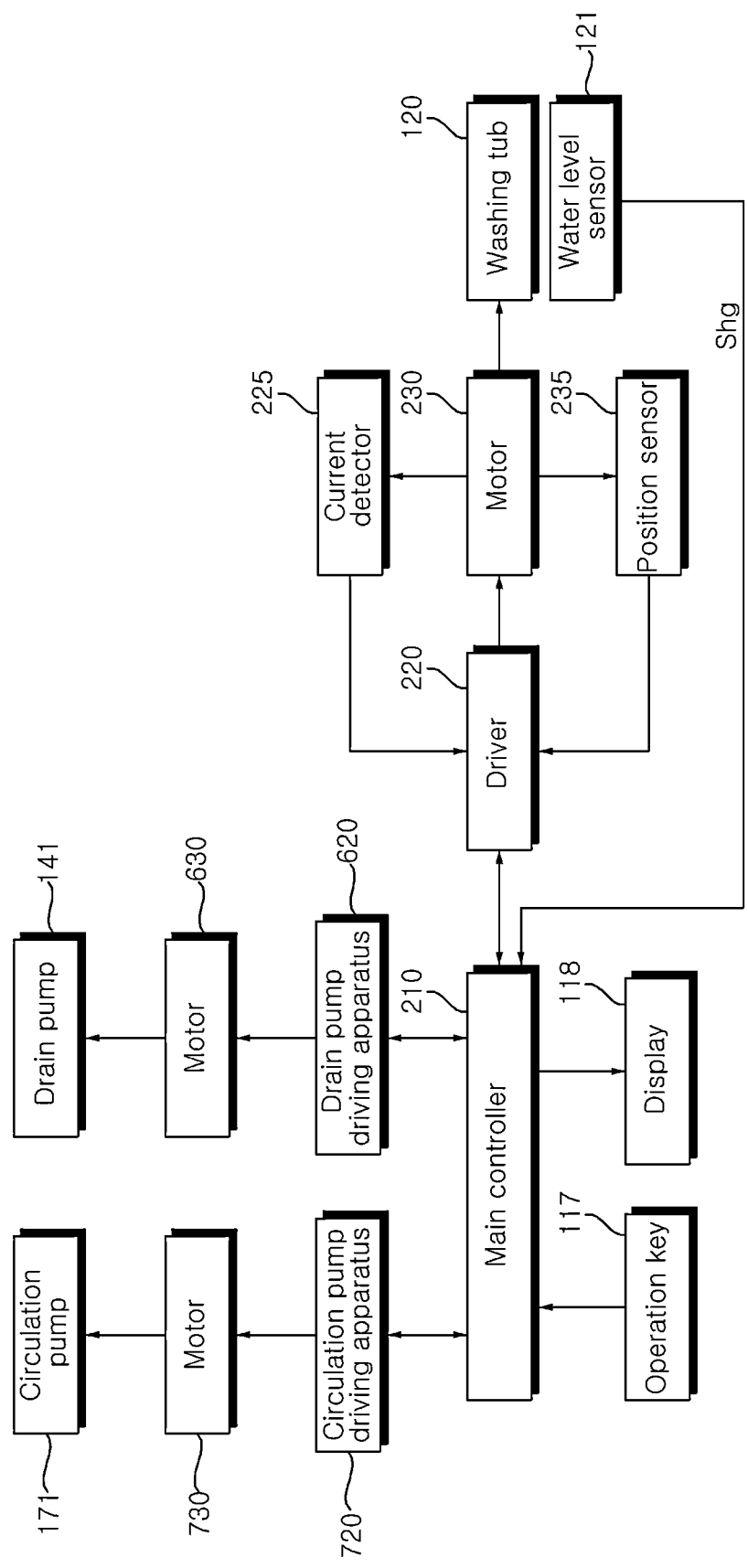
FIG. 3 is an internal block diagram of the laundry treatment machine of FIG. 1.

The driving apparatus 138 is operated by a driver 220 of FIG. 3, that is, a driving circuit. This will be described later with reference to FIG. 3 and other drawings.

A detergent box 114 for accommodating various additives such as a laundry detergent, a fabric softener, and/or a bleaching agent is retrievably provided to the top cover 112, and the wash water supplied through a water supply channel 123 flows into the inner tub 122 via the detergent box 114.

A plurality of holes (not shown) is formed in the inner tub 122. Thereby, the wash water supplied to the inner tub 122 flows to the outer tub 124 through the plurality of holes. A water supply valve 125 for regulating the water supply channel 123 may be provided.

The wash water is drained from the outer tub 124 through a drain channel 143. A drain valve 145 for regulating the drain channel 143 and a drain pump 141 for pumping the wash water may be provided.

Moreover, a circulation pump 171 for pumping wash water may be provided on an end of the drain channel 143. The wash water pumped by the circulation pump 171 may be introduced into a washing tub 120 through a circulation channel 144.

The support rod 135 is provided to hang the outer tub 124 in the casing 110. One end of the support rod 135 is connected to the casing 110 and the other end of the support rod 135 is connected to the outer tub 124 by a suspension 150.

The suspension 150 attenuates vibration of the outer tub 124 during the operation of the washing machine 100. For example, the outer tub 124 may be vibrated by vibration generated as the inner tub 122 rotates. While the inner tub 122 rotates, the vibration caused by various factors such as unbalance laundry amount of laundry in the inner tub 122, the rotation speed of the inner tub 122 or the resonance characteristics of the inner tub 122 can be attenuated.

FIG. 3 is an internal block diagram of the laundry treatment machine of FIG. 1.

Referring to FIG. 3, in the laundry treatment machine 100, the driver 220 is controlled by the main controller 210, and the driver 220 drives the motor 230. Thereby, the washing tub 120 is rotated by the motor 230.

Meanwhile, the laundry treatment machine 100 may include a motor 630 for driving the drain pump 141 and a drain pump driving apparatus 620 for driving the motor 630. The drain pump driving apparatus 620 may be controlled by the main controller 210.

Meanwhile, the laundry treatment machine 100 may include a motor 730 for driving the circulation pump 171 and a circulation pump driving apparatus 720 for driving the motor 730. The circulation pump driving apparatus 720 may be controlled by the main controller 210.

In this specification, the drain pump driving apparatus 620 may be referred to as a drain pump driver.

The main controller 210 operates by receiving an operation signal from an operation key 117. Accordingly, washing, rinsing, and dewatering processes may be performed.

In addition, the main controller 210 may control the display 118 to display a washing course, a washing time, a dewatering time, a rinsing time, a current operation state, or the like.

Meanwhile, the main controller 210 controls the driver 220 to operate the motor 230. For example, the main controller 210 may control the driver 220 to rotate the motor 230, based on a current detector 225 for detecting an output current flowing in the motor 230 and a position sensor 235 for sensing a position of the motor 230. While it is illustrated in FIG. 3 that the detected current and the sensed position signal are input to the driver 220, embodiments of the present disclosure are not limited thereto. The detected current and the sensed position signal may be input to the main controller 210 or to both the main controller 210 and the driver 220.

The driver 220, which serves to drive the motor 230, may include an inverter (not shown) and an inverter controller (not shown). In addition, the driver 220 may further include a converter or the like for supplying a direct current (DC) voltage input to the inverter (not shown).

For example, when the inverter controller (not shown) outputs a switching control signal in a pulse width modulation (PWM) scheme to the inverter (not shown), the inverter (not shown) may perform a high-speed switching operation to supply an alternating current (AC) voltage at a predetermined frequency to the motor 230.

The main controller 210 may sense a laundry amount based on a current io detected by the current detector 225 or a position signal H sensed by the position sensor 235. For example, while the washing tub 120 rotates, the laundry amount may be sensed based on the current value io of the motor 230.

The main controller 210 may sense an amount of eccentricity of the washing tub 120, that is, an unbalance (UB) of the washing tub 120. The sensing of the amount of eccentricity may be performed based on a ripple component of the current io detected by the current detector 225 or an amount of change in rotation speed of the washing tub 120.

Meanwhile, a water level sensor 121 may measure a water level in the washing tub 120.

For example, a water level frequency at a zero water level with no water in the washing tub 120 may be 28 KHz, and a frequency at a full water level at which water reaches an allowable water level in the washing tub 120 may be 23 KHz.

That is, the frequency of the water level detected by the water level sensor 121 may be inversely proportional to the water level in the washing tub.

The water level Shg in the washing tub output from the water level sensor 121 may be a water level frequency or a water level that is inversely proportional to the water level frequency.

Meanwhile, the main controller 210 may determine whether the washing tub 120 is at a full water level, a zero water level, or a reset water level, based on the water level Shg in the washing tub detected by the water level sensor 121.

Figure 4:
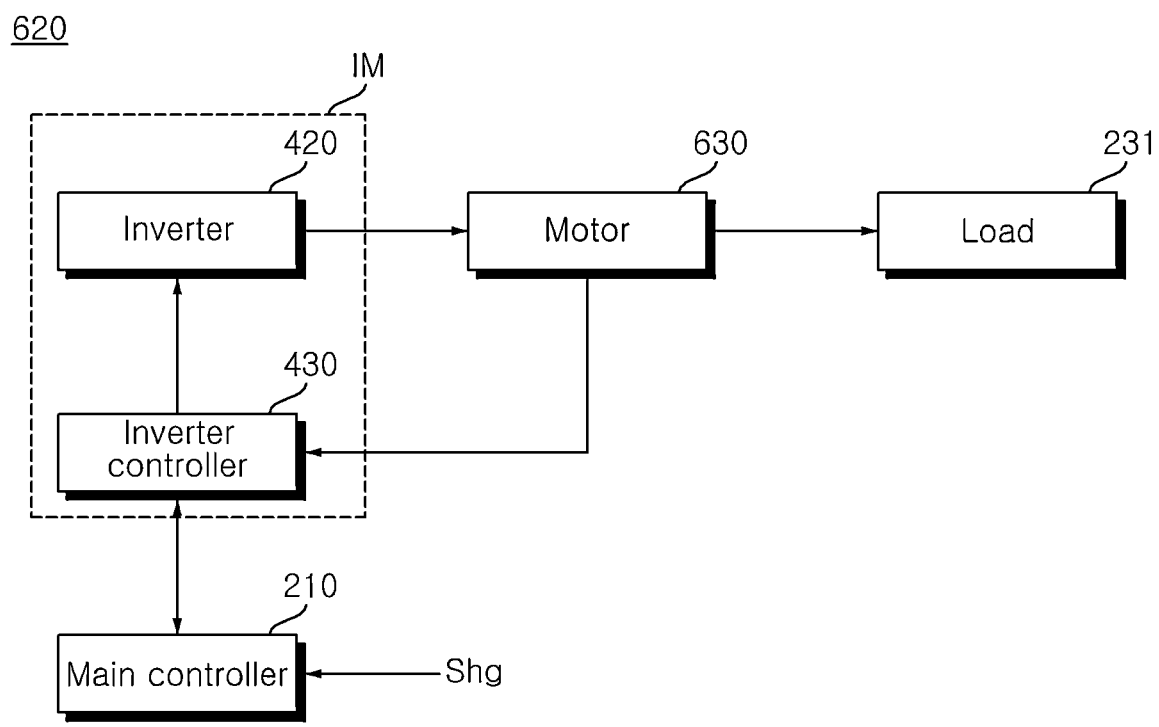
FIG. 4 illustrates an example of an internal block diagram of a drain pump driving apparatus of FIG. 1.
Figure 5:
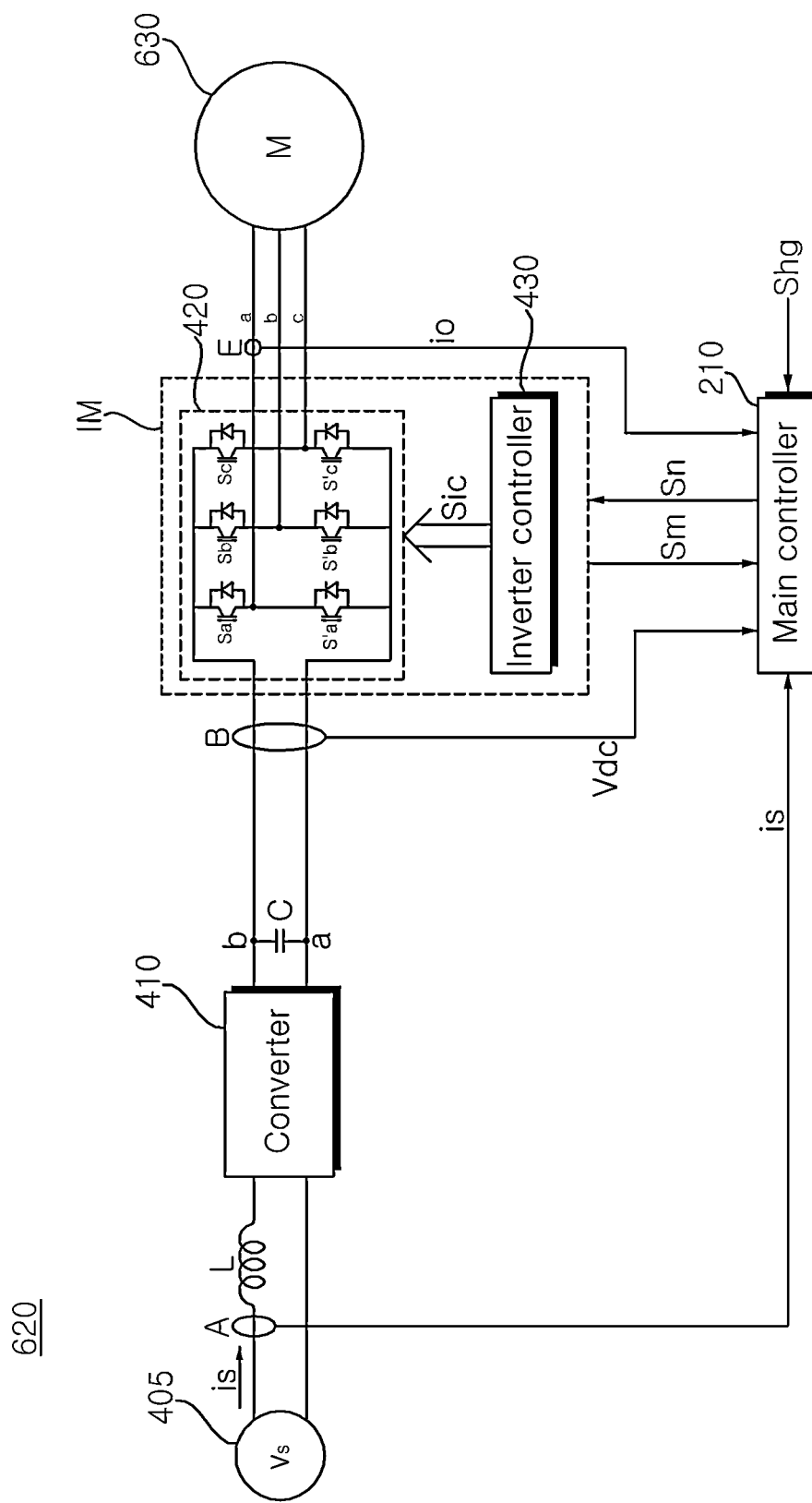
FIG. 5 illustrates an example of an internal circuit diagram of the drain pump driving apparatus of FIG. 4.

FIG. 4 illustrates an example of an internal block diagram of the drain pump driving apparatus of FIG. 1, and FIG. 5 illustrates an example of an internal circuit diagram of the drain pump driving apparatus of FIG. 4.

Referring to FIGS. 4 and 5, the drain pump driving apparatus 620 according to an embodiment of the present disclosure serves to drive the motor 630 in a sensorless manner, and may include an inverter 420, an inverter controller 430, and a main controller 210.

The main controller 210 and the inverter controller 430 may correspond to a controller and a second controller described in this specification, respectively.

The drain pump driving apparatus 620 according to an embodiment of the present disclosure may include a converter 410, a DC terminal voltage detector B, a DC terminal capacitor C, and an output current detector E. In addition, the drain pump driving apparatus 620 may further include an input current detector A and a reactor L.

Hereinafter, an operation of each constituent unit in the drain pump driving apparatus 620 of FIGS. 4 and 5 will be described.

The reactor L is disposed between a commercial AC voltage source 405 (vs) and the converter 410, and performs a power factor correction operation or a boost operation. In addition, the reactor L may also function to limit a harmonic current resulting from high-speed switching of the converter 410.

The input current detector A may detect an input current is input from the commercial AC voltage source 405. To this end, a current transformer (CT), a shunt resistor, or the like may be used as the input current detector A. The detected input current is may be input to the inverter controller 430 or the main controller 210 as a discrete signal in the form of a pulse. In FIG. 5, it is illustrated that the detected input current is input to the main controller 210.

The converter 410 converts the commercial AC voltage source 405 having passed through the reactor L into a DC voltage and outputs the DC voltage. Although the commercial AC voltage source 405 is shown as a single-phase AC voltage source in FIG. 5, it may be a 3-phase AC voltage source. The converter 410 has an internal structure that varies depending on the type of commercial AC voltage source 405.

Meanwhile, the converter 410 may be configured with diodes or the like without a switching device, and may perform a rectification operation without a separate switching operation.

For example, in case of the single-phase AC voltage source, four diodes may be used in the form of a bridge. In case of the 3-phase AC voltage source, six diodes may be used in the form of a bridge.

As the converter 410, for example, a half-bridge type converter having two switching devices and four diodes connected to each other may be used. In case of the 3-phase AC voltage source, six switching devices and six diodes may be used for the converter.

When the converter 410 has a switching device, a boost operation, a power factor correction, and a DC voltage conversion may be performed by the switching operation of the switching device.

Meanwhile, the converter 410 may include a switched mode power supply (SMPS) having a switching device and a transformer.

The converter 410 may convert a level of an input DC voltage and output the converted DC voltage.

The DC terminal capacitor C smooths the input voltage and stores the smoothed voltage. In FIG. 5, one element is exemplified as the DC terminal capacitor C, but a plurality of elements may be provided to secure element stability.

While it is illustrated in FIG. 5 that the DC terminal capacitor C is connected to an output terminal of the converter 410, embodiments of the present disclosure are not limited thereto. The DC voltage may be input directly to the DC terminal capacitor C.

For example, a DC voltage from a solar cell may be input directly to the DC terminal capacitor C or may be DC-to-DC converted and input to the DC terminal capacitor C. Hereinafter, what is illustrated in FIG. 5 will be mainly described.

Both ends of the DC terminal capacitor C may be referred to as DC terminals or DC link terminals because the DC voltage is stored therein.

The DC terminal voltage detector B may detect a voltage Vdc between the DC terminals, which are both ends of the DC terminal capacitor C. To this end, the DC terminal voltage detector B may include a resistance element and an amplifier. The detected DC terminal voltage Vdc may be input to the inverter controller 430 or the main controller 210 as a discrete signal in the form of a pulse. In FIG. 5, it is illustrated that the detected DC terminal voltage Vdc is input to the main controller 210.

The inverter 420 may include a plurality of inverter switching devices. The inverter 420 may convert the smoothed DC voltage Vdc into an AC voltage by an on/off operation of the switching device, and output the AC voltage to the synchronous motor 630.

For example, when the synchronous motor 630 is in a 3-phase type, the inverter 420 may convert the DC voltage Vdc into 3-phase AC voltages va, vb and vc and output the 3-phase AC voltages to the three-phase synchronous motor 630 as shown in FIG. 5.

As another example, when the synchronous motor 630 is in a single-phase type, the inverter 420 may convert the DC voltage Vdc into a single-phase AC voltage and output the single-phase AC voltage to a single-phase synchronous motor 630.

The inverter 420 includes upper switching devices Sa, Sb and Sc and lower switching devices S'a, S'b and S'c. Each of the upper switching devices Sa, Sb and Sc that are connected to one another in series and a respective one of the lower switching devices S'a, S'b and S'c that are connected to one another in series form a pair. Three pairs of upper and lower switching devices Sa and S'a, Sb and S'b, and Sc and S'c are connected to each other in parallel. Each of the switching devices Sa, S'a, Sb, S'b, Sc and S'c is connected with a diode in anti-parallel.

Each of the switching devices in the inverter 420 is turned on/off based on an inverter switching control signal Sic from the inverter controller 430. Thereby, an AC voltage having a predetermined frequency is output to the synchronous motor 630.

The inverter controller 430 may output the switching control signal Sic to the inverter 420.

In particular, the inverter controller 430 may output the switching control signal Sic to the inverter 420, based on a voltage command value Sn input from the main controller 210.

The inverter controller 430 may output voltage information Sm of the motor 630 to the main controller 210, based on the voltage command value Sn or the switching control signal Sic.

The inverter 420 and the inverter controller 430 may be configured as one inverter module IM, as shown in FIG. 4 or 5.

The main controller 210 may control the switching operation of the inverter 420 in a sensorless manner.

To this end, the main controller 210 may receive an output current io detected by the output current detector E and a DC terminal voltage Vdc detected by the DC terminal voltage detector B.

The main controller 210 may calculate a power based on the output current io and the DC terminal voltage Vdc, and output a voltage command value Sn based on the calculated power.

In particular, the main controller 210 may perform power control to stably operate the drain motor 630 and output a voltage command value Sn based on the power control. Accordingly, the inverter controller 430 may output a switching control signal Sic corresponding to the voltage command value Sn based on the power control.

The output current detector E may detect an output current io flowing in the 3-phase motor 630.

The output current E may be disposed between the 3-phase drain motor 630 and the inverter 420 to detect an output current io flowing in the motor. In the drawing, it is illustrated that the a-phase current is detected, out of the phase current ia, ib, and ic which is the output current io flowing in the drain motor 630.

Meanwhile, as opposed to the drawing, the output current detector E may be disposed between the DC terminal capacitor C and the inverter 420 and sequentially detect the output current flowing in the motor. In this case, one shunt resistance element Rs may be used, and the phase current ia, ib, and ic flowing in the drain motor 630 may be detected in a time-division manner.

The detected output current io may be input to the inverter controller 430 or the main controller 210 as a discrete signal in the form of a pulse. In FIG. 5, it is illustrated that the detected output current idc is input to the main controller 210.

The 3-phase motor 630 includes a stator and a rotor. The rotor rotates when the AC voltage at a predetermined frequency for each phase is applied to a coil of the stator for each phase (phase a, b or c).

Such a motor 630 may include a brushless DC (BLDC) motor.

The motor 630 may include, for example, a surface-mounted permanent-magnet synchronous motor (SMPMSM), an interior permanent magnet synchronous motor (IPMSM), and a synchronous reluctance motor (SynRM). The SMPMSM and the IPMSM are permanent magnet synchronous motors (PMSM) employing permanent magnets, while the SynRM has no permanent magnet.

Figure 6:
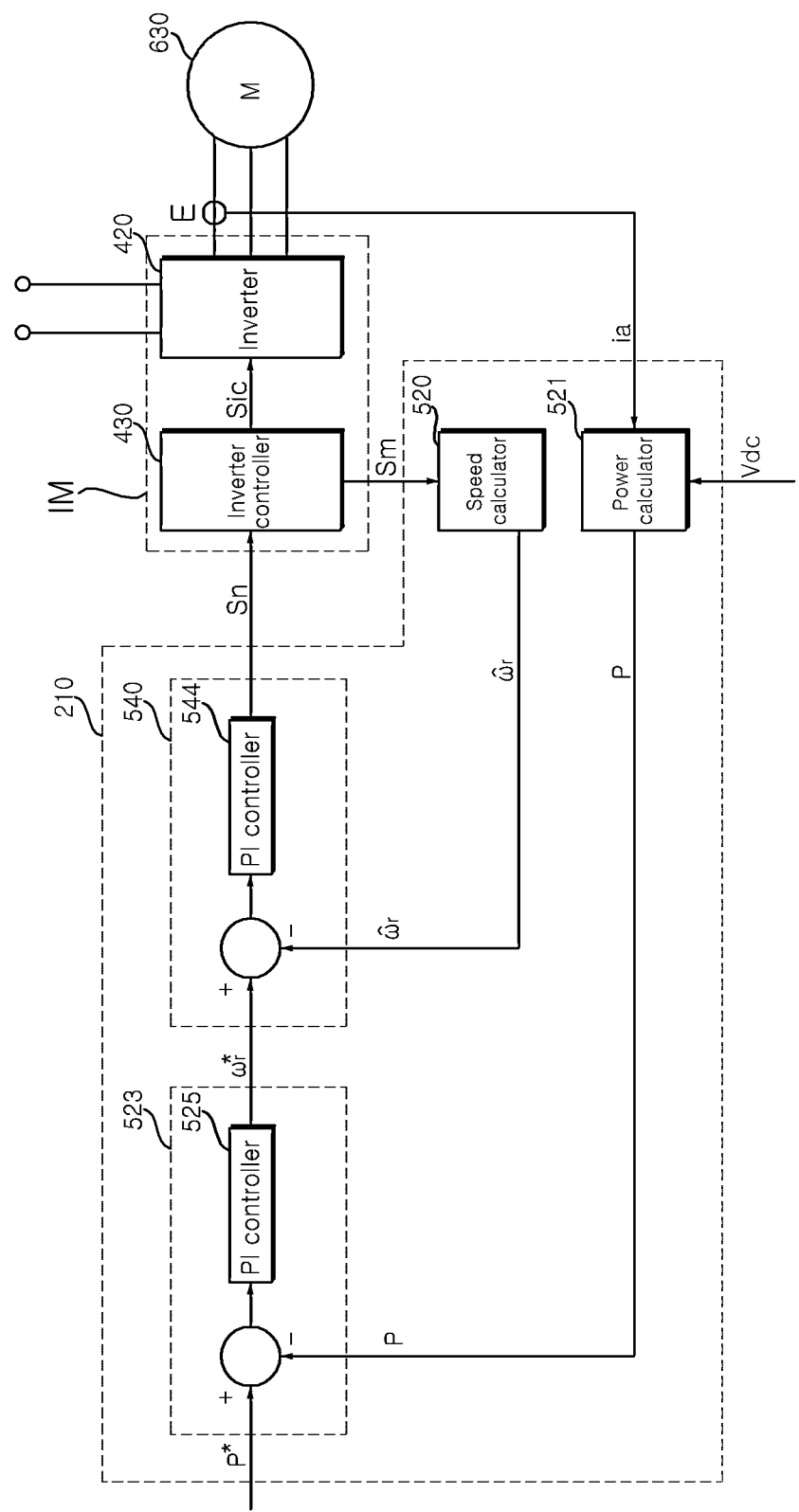
FIG. 6 is an internal block diagram of a main controller of FIG. 5.

FIG. 6 is an internal block diagram of a main controller of FIG. 5.

Referring to FIG. 6, the main controller 210 may include a speed calculator 520, a power calculator 521, a power controller 523, and a speed controller 540.

The speed calculator 520 may calculate a speed of the drain motor 630, based on the voltage information Sm of the motor 630 received from the inverter controller 430.

Specifically, the speed calculator 520 may calculate a zero crossing for the voltage information Sm of the motor 630 received from the inverter controller 430, and calculate a speed of the drain motor 630 based on the zero crossing.

The power calculator 521 may calculate a power P supplied to the motor 630, based on the output current idc detected by the output current detector E and the DC terminal voltage Vdc detected by the DC terminal voltage detector B.

The power controller 523 may generate a speed command value ω*r based on the power P calculated by the power calculator 521 and a preset power command value P*r.

For example, the power controller 523 may generate the speed command value ω*r, while a PI controller 525 performs PI control, based on a difference between the calculated power P and the power command value P*r.

Meanwhile, the speed controller 540 may generate a voltage command value Sn, based on the speed calculated by the speed calculator 520 and the speed command value ω*r generated by the power controller 523.

Specifically, the speed controller 540 may generate the voltage command value Sn, while a PI controller 544 performs PI control, based on a difference between the calculated speed and the speed command value ω*r.

The generated voltage command value Sn may be output to the inverter controller 430.

The inverter controller 430 may receive the voltage command value Sn from the main controller 210, and generate and output an inverter switching control signal Sic in the PWM scheme.

The output inverter switching control signal Sic may be converted into a gate drive signal in a gate driver (not shown), and the converted gate drive signal may be input to a gate of each switching device in the inverter 420. Thus, each of the switching devices Sa, S'a, Sb, S'b, Sc and S'c in the inverter 420 performs a switching operation. Accordingly, the power control can be performed stably.

Meanwhile, during drainage, the main controller 210 according to the embodiment of the present disclosure may control the power supplied to the drain motor 630 to be constant without decreasing over time. Accordingly, the drainage time may be reduced.

Meanwhile, the main controller 210 according to the embodiment of the present disclosure may perform power control on the drain motor 630 at the start of drainage, and, when the remainder of the water is reached, may finish the power control. Accordingly, drainage operation may be performed efficiently.

The main controller 210 according to an embodiment of the present disclosure may control the voltage command value Sn and a duty of the switching control signal Sic to be greater as the output current io is at a smaller level. Accordingly, the motor 630 can be driven with a constant power.

The drain motor 630 according to an embodiment of the present disclosure may be implemented as a brushless DC motor 630. Accordingly, the power control, rather than constant-speed control, can be implemented in a simple manner.

Meanwhile, the main controller 210 according to another embodiment of the present disclosure may be configured to increase the speed of the drain motor 630 during the drainage if the power supplied to the motor 630 does not reach the first power and to decrease the speed of the drain motor 630 if the power supplied to the motor 630 exceeds the first power.

Meanwhile, the main controller 210 according to the embodiment of the present disclosure may control the speed of the motor 630 to be constant, if the power supplied to the motor 630 reaches the first power.

Since the power control allows for driving at constant power as described above, the converter 410 supplies constant power, thereby improving the stability of the converter 410. Also, the power control allows for minimizing a decrease in drainage performance according to installation conditions.

Moreover, the drain motor 630 may be driven stably, and, therefore, the drainage time may be reduced.

Figure 7:
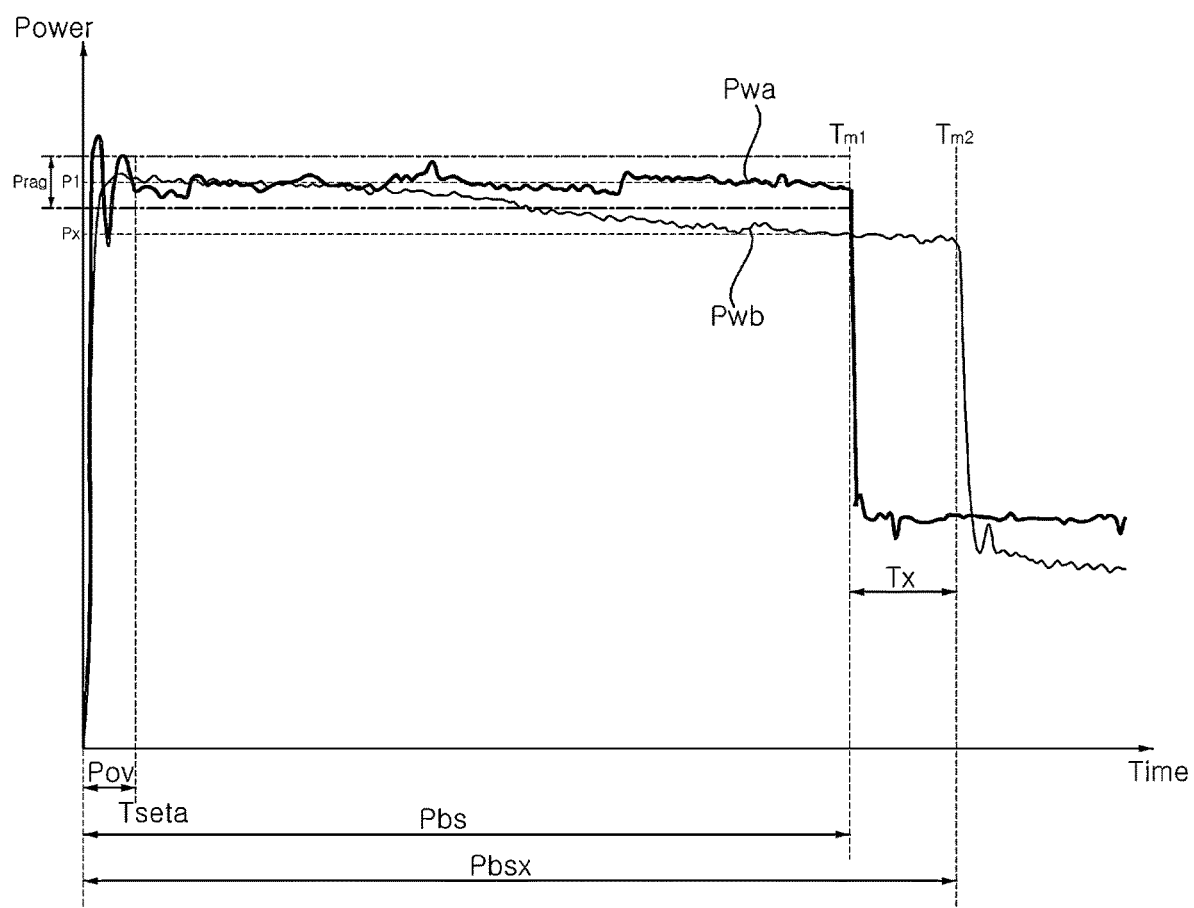
FIG. 7 is a view showing power supplied to a motor according to power control and speed control.

FIG. 7 is a view showing power supplied to a motor according to power control and speed control.

When the power control is performed as in the embodiments of the present disclosure, a time-dependent waveform of the power supplied to the motor 630 may be exemplified as Pwa.

FIG. 7 illustrates that the power is maintained in a substantially constant manner until time point Tm1 by performing the power control, and the power control is terminated at time point Tm1.

By performing the power control, the main controller 210 may control the power supplied to the motor 630, during the drainage, to be constant without decreasing over time, although the water level in the washing tub 120 decreases.

By performing the power control, the main controller 210 may control the power supplied to the motor 630, during the drainage, to be the first power P1.

In particular, even if the lift is changed, the main controller 210 may control the power supplied to the motor 630, during the drainage, to be the constant first power P1, by performing the power control.

At this time, the constant first power P1 may mean that the motor 630 is driven with a power within a first allowable range Prag based on the first power P1. For example, the power within the first allowable range Prag may be a power pulsating within about 10% based on the first power P1.

In FIG. 7, it is illustrated that when the power control is performed, the motor 630 is driven with a power within the first allowable range Prag based on the first power P1 from time point Tseta until time point Tm1 when the drainage is completed, excluding an overshooting period Pov. Accordingly, water pumping can be performed smoothly even if the lift is changed during the drainage. In addition, the stability of the converter 410 can be improved.

Here, the first allowable range Prag may be greater as the first power P1 is at a higher level. In addition, the first allowable range Prag may be greater as a drainage completion period Pbs is longer.

That is, when the lift is at a reference level Iref, the main controller 210 may control the motor 630 to be driven with a power within the first allowable range Prag based on the first power P1, without decreasing over time, from first time point Tseta after the drainage is started until time point Tm1 when the drainage is completed, and when the lift is at a second level, the main controller 210 may control the motor 630 to be driven with a power within the first allowable range Prag based on the first power P1, without decreasing over time, from first time point Tseta until time point Tm1 when the drainage is completed.

To this end, when the power control is performed during the drainage, the main controller 210 may calculate a power based on the output current io and the DC terminal voltage Vdc and output a voltage command value Sn based on the calculated power, and the inverter controller 430 may output a switching control signal Sic to the motor 630 based on the voltage command value Sn.

Meanwhile, the main controller 210 may control the voltage command value Sn and a duty of the switching control signal Sic to be greater as the output current io is at a smaller level. Accordingly, the motor 630 can be driven with a constant power.

Meanwhile, the main controller 210 may control the power supplied to the drain motor 630 to increase abruptly during a period PoV to perform power control.

Meanwhile, the main controller 210 may control the power supplied to the drain motor 630 to decrease abruptly from the time point Tm1.

Unlike the embodiments of the present disclosure, when the speed control is performed, that is, when the speed of the drain motor 630 is controlled to be maintained constantly, a time-dependent waveform of the power supplied to the motor 630 may be exemplified as Pwb.

In the drawing, it is illustrated that the speed control is performed until time point Tm2, and the speed control is terminated at time point Tm2.

The waveform Pwb of the power based on the speed control indicates that the power supplied to the motor 630 may be gradually reduced, while the speed of the motor 630 is constant, as the water level in the washing tub decreases during the drainage.

In FIG. 7, it is illustrated that, during a speed control period Pbsx, the power supplied to the motor 630 is gradually reduced up to approximately Px at time point Tm2 when the drainage is completed.

Accordingly, the time when the operation of the motor 630 is terminated in a case where the speed control is performed is Tm2, which is delayed by approximately period Tx, when compared to that in a case where the power control is performed.

Consequently, according to the embodiments of the present disclosure, since the power control is performed during the drainage, the drainage time can be shortened by approximately period Tx, when compared to that in the case where the speed control is performed. In addition, the power supplied from the converter 410 can be kept constant, thereby improving the operation stability of the converter 410.

Figure 8:
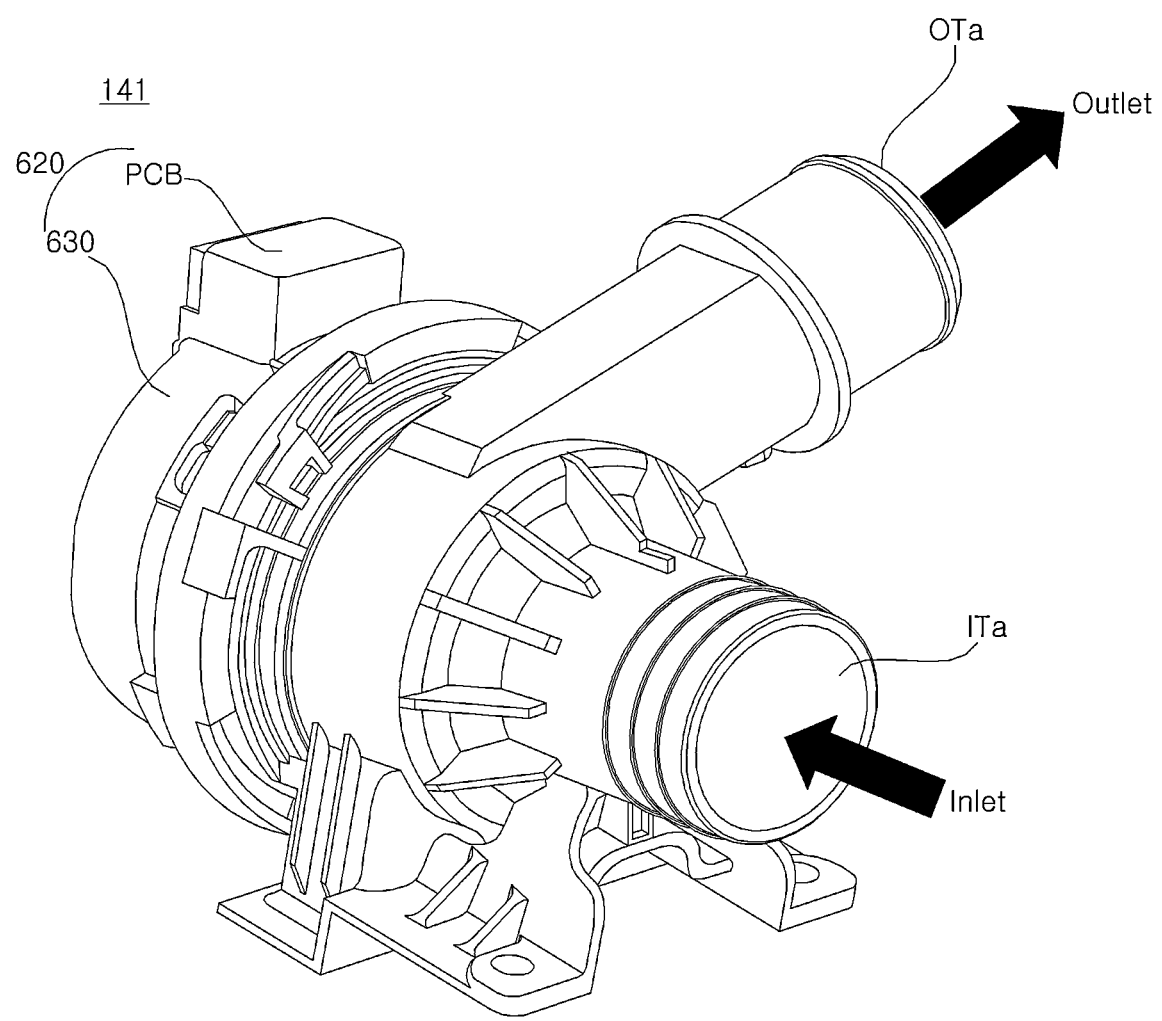
FIGS. 8 and 9 are views illustrating the outer appearance of a drain pump driving apparatus according to an embodiment of the present disclosure.
Figure 9:
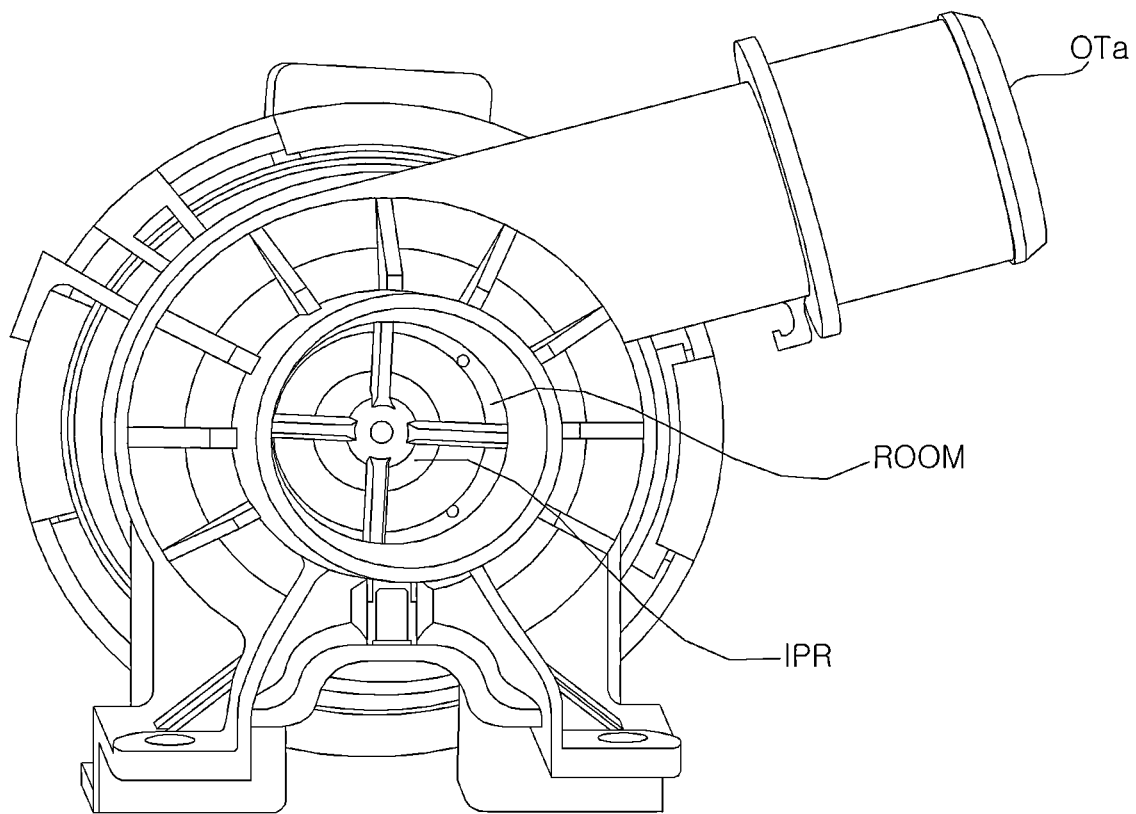

FIGS. 8 and 9 are views illustrating the outer appearance of a drain pump driving apparatus according to an embodiment of the present disclosure.

Referring to FIGS. 8 and 9, wash water is drained through the drain channel 143 connected to the outer tub 124, and the drain channel 143 is connected to a water introduction part ITa of the drain pump 141.

The water introduction part ITa is formed of a hollow tube, and a vortex chamber ROOM with a larger diameter than that of the water introduction part ITa is formed within the water introduction part ITa.

An impeller IPR which rotates by the torque of the motor 630 is disposed in the vortex chamber ROOM.

Meanwhile, the motor 630 and a circuit board PCB for applying an electrical signal to the motor 630 may be disposed on the opposite side of the water introduction part ITa relative to the impeller IPR. The above-described drain pump driving apparatus 220 may be mounted on the circuit board PCB.

Meanwhile, a water discharge part OTa for discharging water may be disposed on one side of the vortex chamber ROOM, in a direction intersecting the water introduction part ITa. In this case, the water discharge part OTa may be connected to a drain pipe 199.

Particularly, the water discharge part OTa may be formed in a direction normal to the vortex chamber ROOM, for smooth drainage. Such a structure of the drain pump 141 may be called a volute-type drain pump structure.

In the volute-type drain pump structure, the water discharge part OTa is formed on one side of the vortex chamber ROOM. Thus, it is preferable that the motor 730 rotates clockwise CW relative to FIG. 9.

Meanwhile, as described above, since the drain pipe 199 is positioned higher than the drain pump 141, the water discharge part OTa may be sloped in the direction of the drain pipe 199.

Similarly, the water introduction part ITa also may be sloped, and the angle of slope of the water introduction part ITa to the ground may be smaller than the angle of slope of the water discharge part OTa to the ground. Therefore, water is introduced more smoothly into the water introduction part ITa, and the water in the vortex chamber ROOM is discharged through the water discharge part OTa by means or the impeller IPR which rotates by the torque of the motor 630.

Meanwhile, impurities may be introduced into the vortex chamber ROOM, as well as the water in the washing tub 120.

Meanwhile, a space between water introduction part ITa and the water discharge part OTa of the drain pump 141 may be referred to as a drain channel BUR in the drain pump 141. The drain channel BUR in the drain pump 141 may conceptually include the vortex chamber ROOM. etc.

Figure 10A:
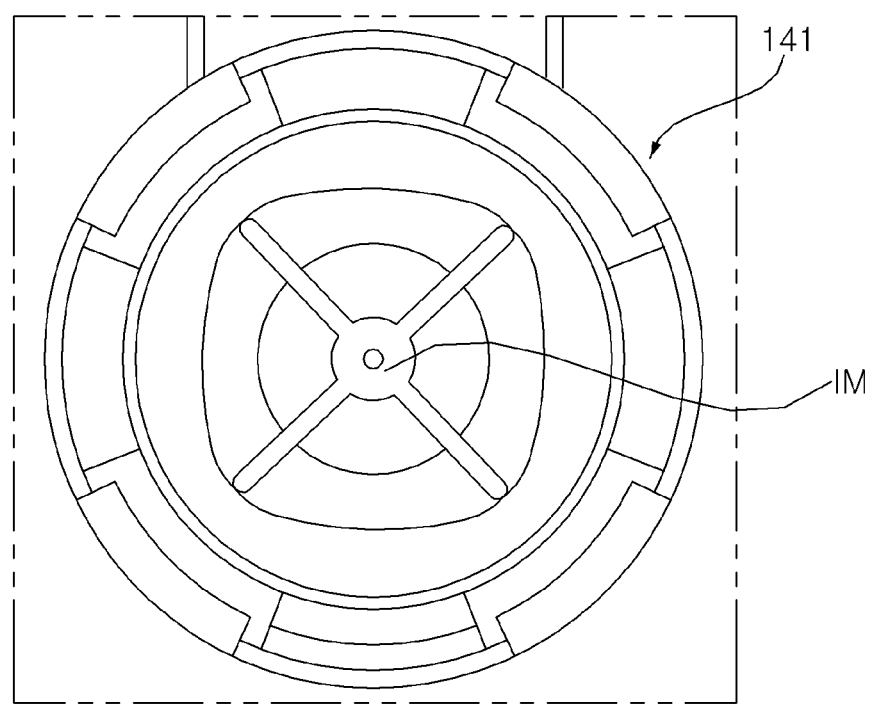
FIGS. 10A to 10B are views illustrating impurities introduced into the drain pump driving apparatus.
Figure 10B:
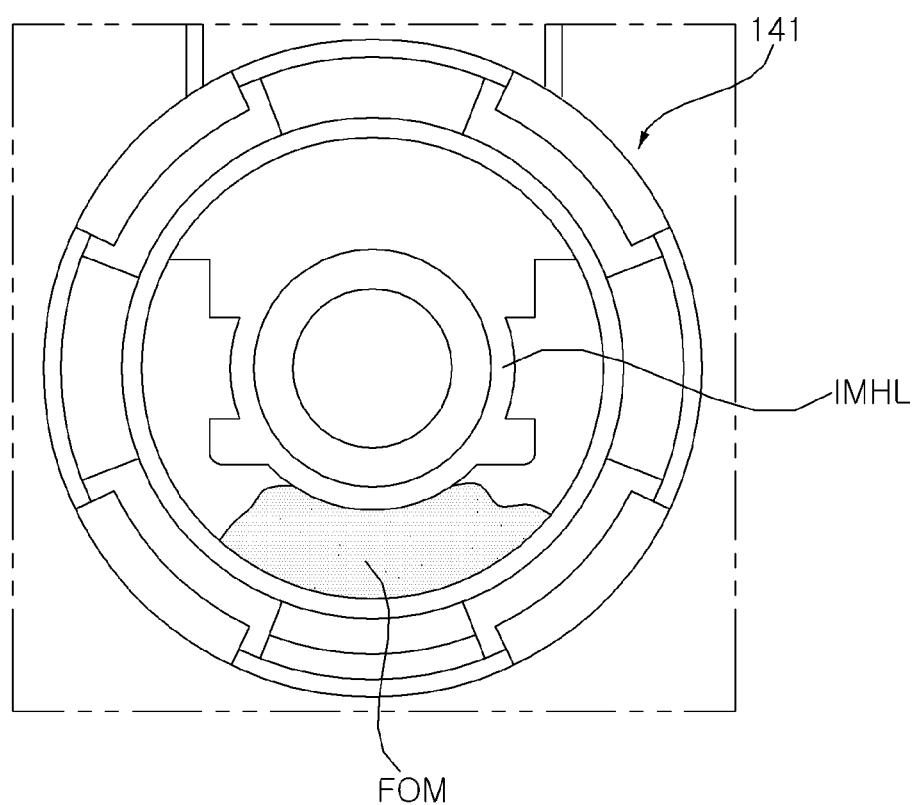

FIGS. 10A to 10B are views illustrating impurities introduced into the drain pump driving apparatus.

FIG. 10A is a view illustrating the impeller IPR within the vortex chamber ROOM, and FIG. 10B illustrates an impeller connecting portion IMHL from which the impeller IPR is removed.

Referring to the drawings, impurities may build up between the impeller IPR rotating relative to a rotating shaft of the motor 630 and the impeller connecting portion IMHL of between the impeller IPR and the rotating shaft, as shown in FIG. 10B.

In this case, the drain motor 630 or the impeller IPR may be restrained, without reaching a desired rotation speed regardless of the driving of the drain motor 630.

Thus, the present disclosure proposes a method for preventing the motor 630 or the impeller IPR from being restrained due to introduction of impurities into the vortex chamber ROOM and removing the impurities in a simple manner. This will be described with reference to FIG. 12 and the subsequent drawings.

Meanwhile, the restraint of the motor 630 or the impeller IPR due to the introduction of impurities may occur mainly when the speed of the motor 630 increases.

Figure 11:
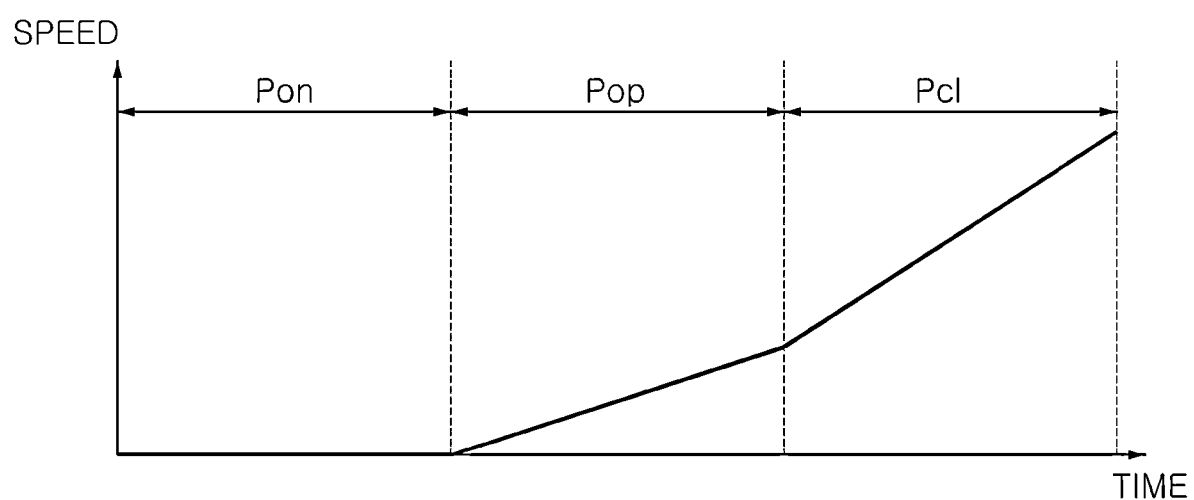
FIG. 11 is a view referred to for explaining the operation of a drain motor.

Meanwhile, a period during which the speed of the motor increases may correspond to an open loop control period or a closed loop control period of FIG. 11.

FIG. 11 is a view referred to for explaining the operation of the drain motor.

Referring to FIG. 11, the operation of the drain motor 630 may be divided into an alignment period Pon, an open loop control period Pop, and a closed loop control period Pcl.

During the alignment period Pon, the main controller 210 may apply a predetermined current to the motor 630 to control the rotor of the motor 630 to be aligned at a predetermined position. Here, the predetermined current may be a magnetic flux current.

Accordingly, during the alignment period Pon, the rotation speed of the motor 630 is 0, as shown in FIG. 11.

Next, after the alignment period Pon, while the rotation speed of the motor 230 continuously increases, the main controller 210 may control the motor 630 to operate in the open loop control period Pop.

During the open loop control period Pop, the speed command value ω*r as in FIG. 6, continuously increases, but the motor 630 is driven based only on the speed command value ω*r without feedback on the output current io detected by the output current detector E.

Next, after the open loop control period Pop, while the rotation speed of the motor 630 continuously increases, the main controller 210 may control the motor 630 to operate in the closed loop control period Pcl.

During the closed loop control period Pcl, the speed command value ω*r as in FIG. 6, continuously increases or is variable, and the main controller 210 may drive the motor 630, with feedback on the output current io detected by the output current detector E, based on a difference between the speed command value ω*r and the output current io.

Figure 12:
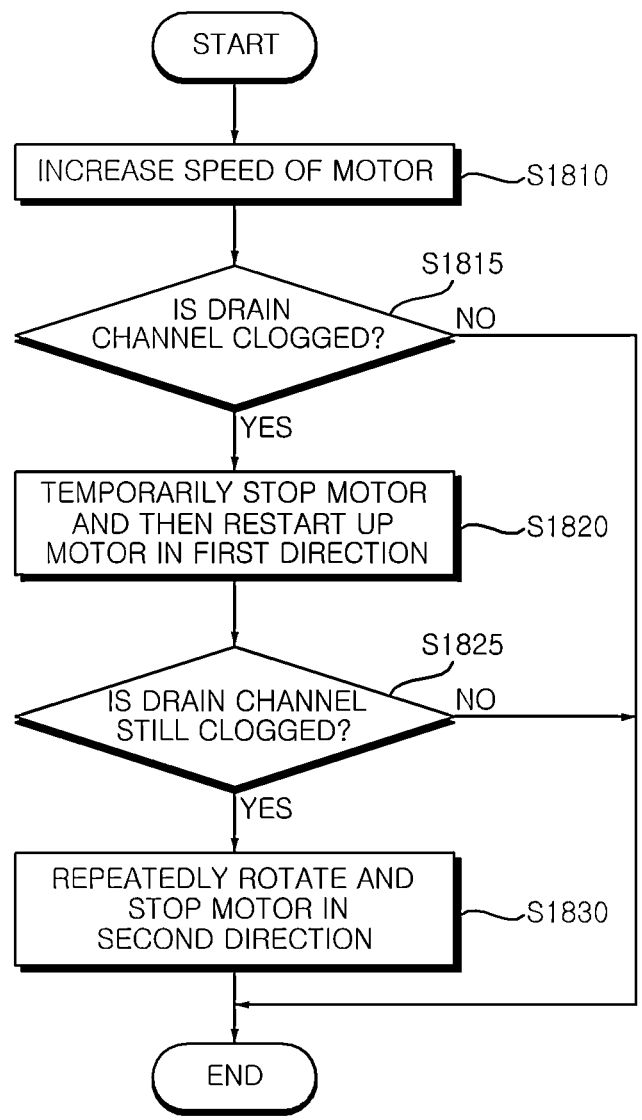
FIG. 12 is a flowchart showing an operation method of a drain pump driving apparatus according to an embodiment of the present disclosure.
Figure 13A:
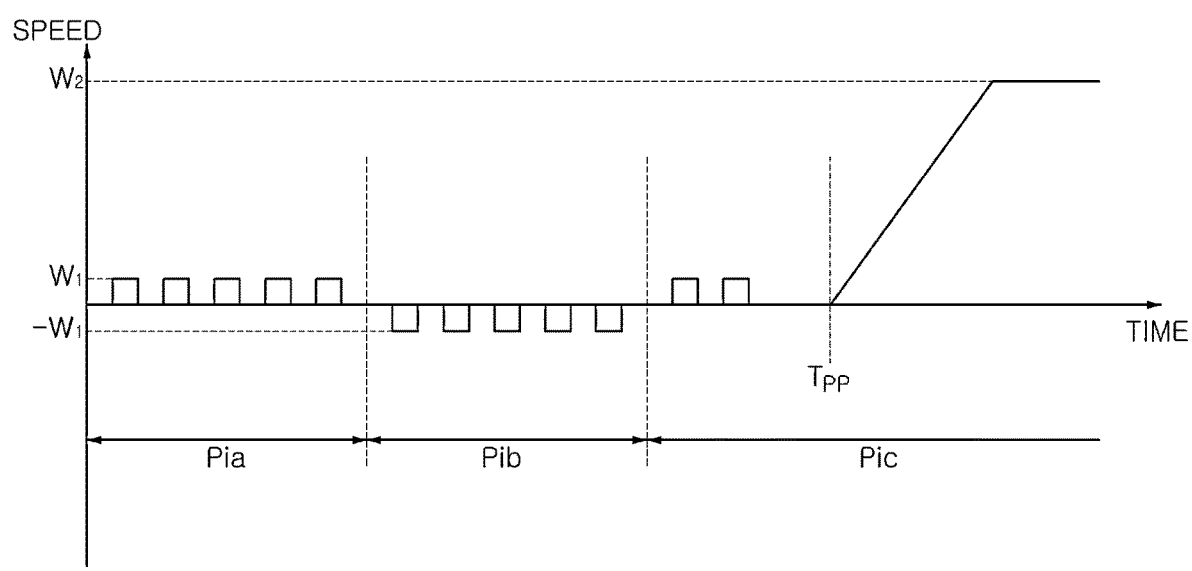
FIGS. 13A to 14 are views referred to for explaining the operation method of FIG. 12.
Figure 13B:
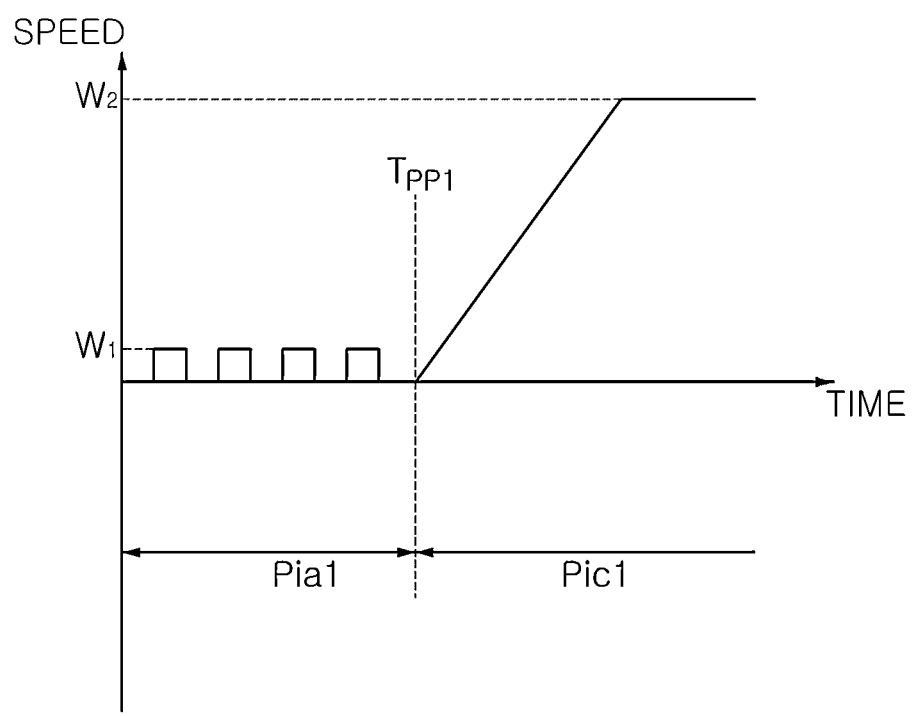
Figure 13C:
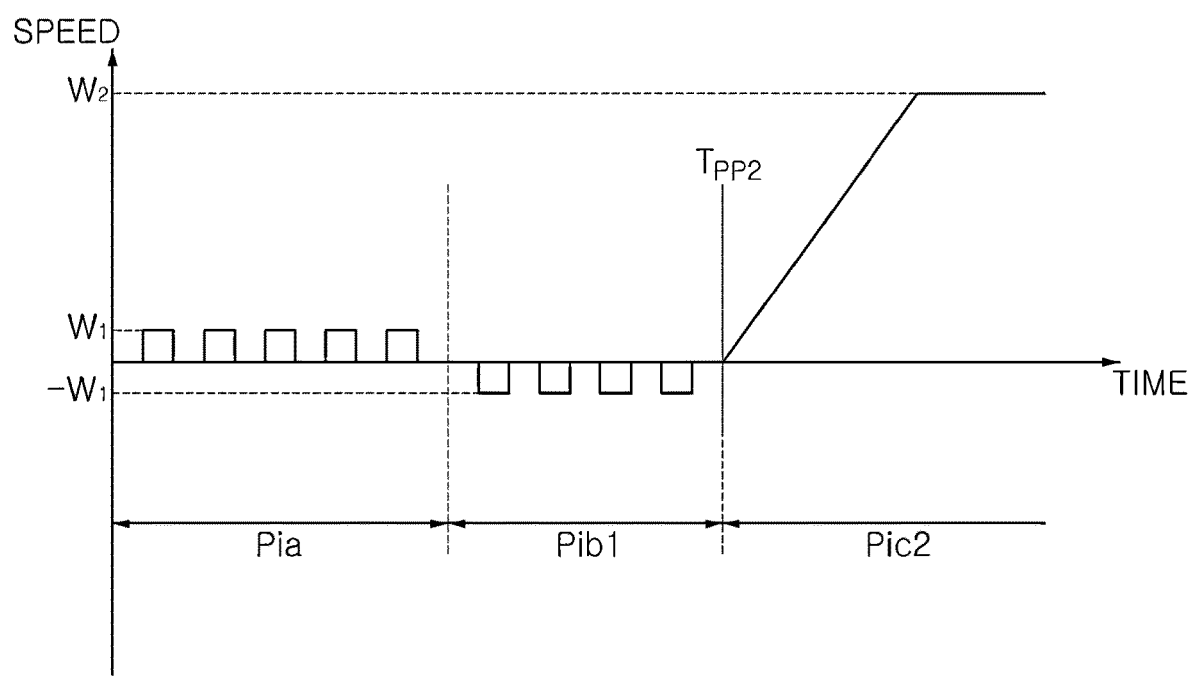
Figure 13D:
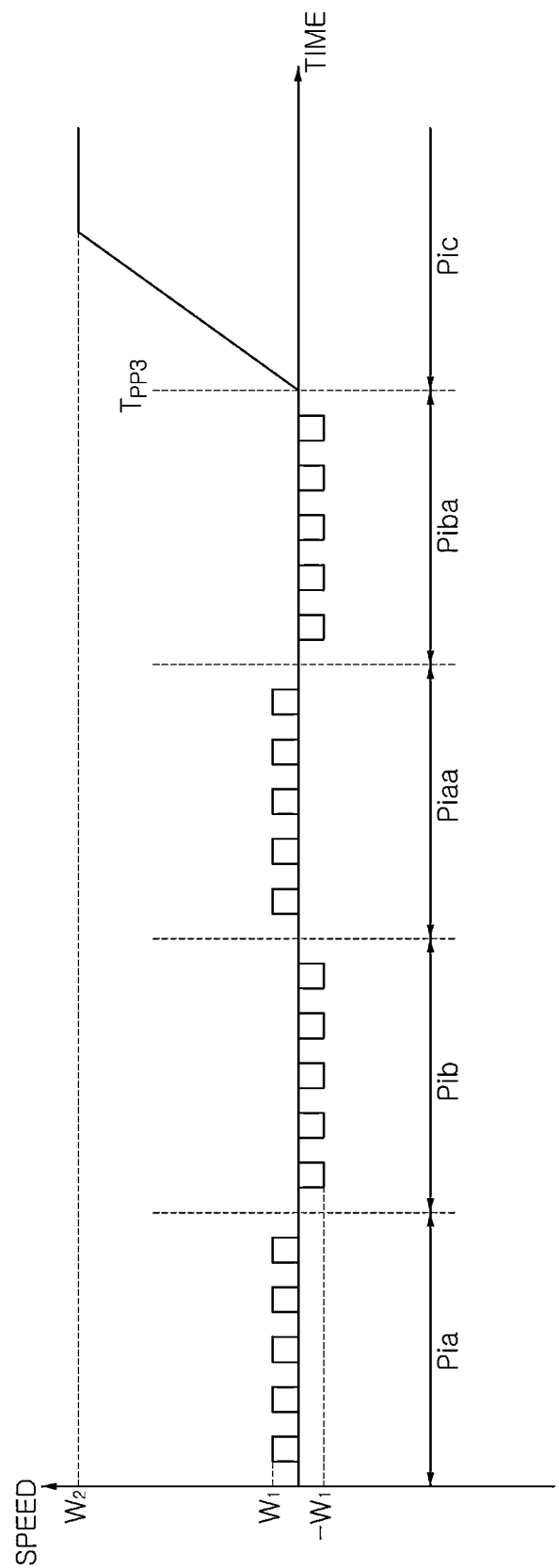
Figure 14:
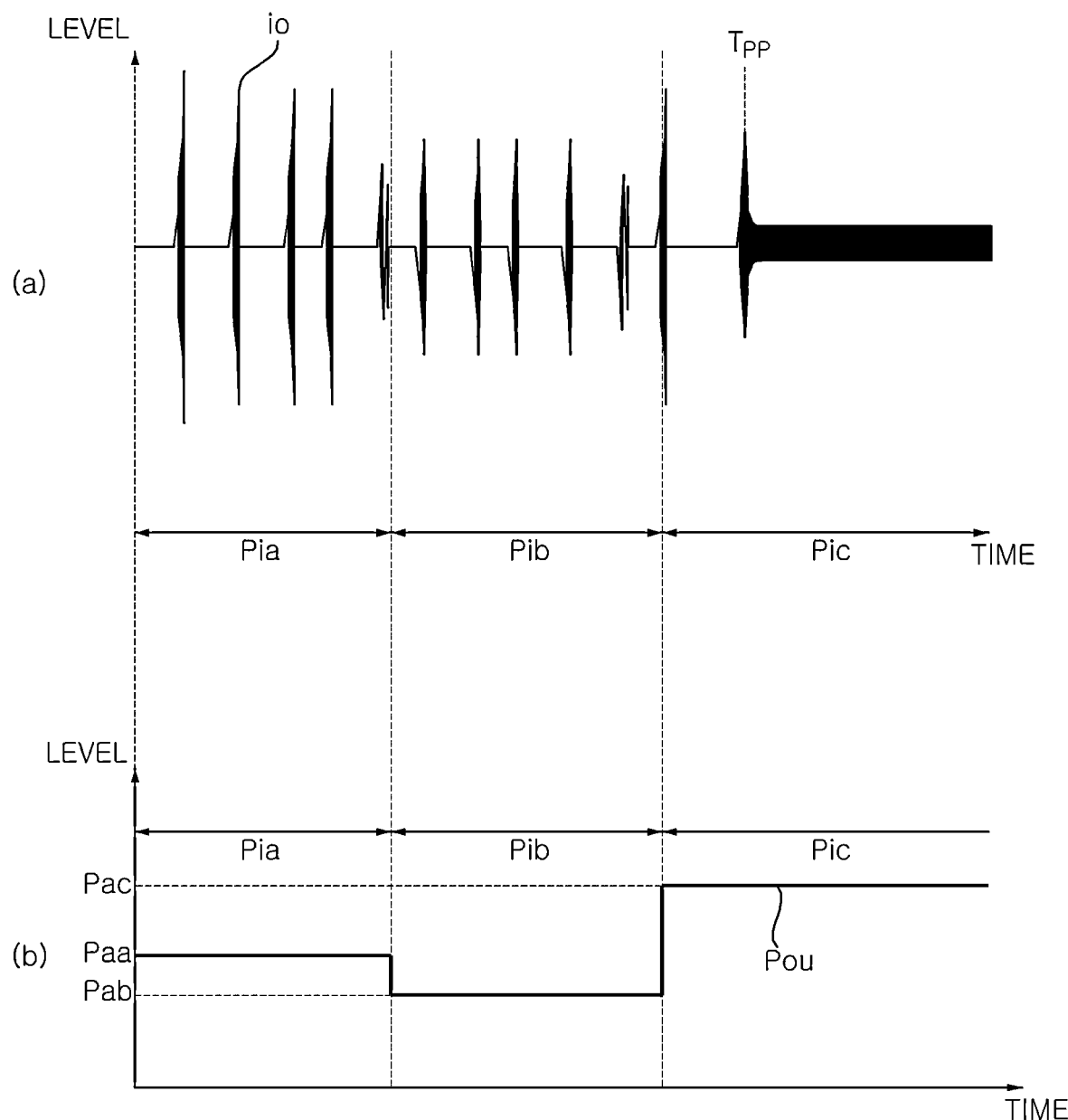

FIG. 12 is a flowchart showing an operation method of a drain pump driving apparatus according to an embodiment of the present disclosure, and FIGS. 13A to 14 are views referred to for explaining the operation method of FIG. 12.

Referring first to FIG. 12, the main controller 210 increases the speed of the drain motor 630 during drainage (S1810).

As illustrated in FIG. 11, the operation of the motor when started up may be divided into the alignment period Pon, the open loop control period Pop, and the closed loop control period Pcl.

Here, the period during which the speed of the drain motor 630 increases may correspond to a period in which the speed increases, either the open loop control period Pop or the closed loop control period Pcl.

Next, the main controller 210 determines whether the drain channel BUR in the drain pump 141 is clogged (S1815).

For example, while the speed of the drain motor 630 increases, if the speed does not continuously increase, the main controller 210 may determine that the drain channel BUR in the drain pump 141 is clogged.

As another example, while the speed of the drain motor 630 increases, if a predetermined period of time elapses in a state where a current speed of the drain motor 630 does not reach a target speed, the main controller 210 may determine that the drain channel BUR in the drain pump 141 is clogged.

As still another example, while the speed of the drain motor 630 increases, if a level of an output current flowing in the drain motor 630 is smaller than a target value, the main controller 210 may determine that the drain channel BUR in the drain pump 141 is clogged.

Next, when the drain channel BUR in the drain pump 141 is clogged, the main controller 210 may temporarily stop the drain motor 630, and then control the drain motor 630 to repeatedly rotate and stop in a first direction the same as a start-up direction, (S1820).

Meanwhile, a speed of the drain motor 630 when the drain motor 630 rotates in the first direction is preferably lower than that in step 1810.

Next, the main controller 210 determines whether the drain channel BUR in the drain pump 141 is still clogged even after the drain motor 630 repeatedly rotates and stops in the first direction (S1825).

For example, when the drain motor 630 repeatedly rotates and stops in the first direction, if the current speed of the drain motor 630 does not reach the target speed set for rotation in the first direction, the main controller 210 may determine that the drain channel BUR in the drain pump 141 is still clogged.

As another example, when the drain motor 630 repeatedly rotates and stops in the first direction, if the level of the output current flowing in the drain motor 630 is smaller than a reference value, the main controller 210 may determine that the drain channel BUR in the drain pump 141 is still clogged.

Next, when the drain channel BUR in the drain pump 141 is still clogged even after the drain motor 630 repeatedly rotates and stops in the first direction, the main controller 210 may control the drain motor 630 to repeatedly rotate and stop in a second direction opposite to the first direction (S1830).

Usually, when the drain channel BUR in the drain pump 141 is clogged with impurities during the rotation of the drain motor 630 in the first direction, if the drain motor 630 repeatedly rotates and stops in the second direction opposite to the first direction, the impurities may be removed in a simple manner.

Meanwhile, when the drain channel BUR in the drain pump 141 is clogged with impurities, the impurities can be removed by various operations. This will be described with reference to FIGS. 13A to 13D.

FIG. 13A illustrates that the motor 630 repeatedly rotates at a speed of W1 and stops five times in the first direction, i.e. clockwise CW, in period Pia.

Further, FIG. 13A illustrates that the motor 630 repeatedly rotates at a speed of −W1 and stops five times in the second direction, i.e. counterclockwise CCW, in period Pib.

In addition, FIG. 13A illustrates that after the motor 630 repeatedly rotates at the speed of W1 and stops twice in the first direction, i.e. clockwise CW, in period Pic, the impurities are discharged from the drain pump 141 and the speed of the motor 630 increases back to target speed W2. Accordingly, when impurities are introduced into the drain pump 141, the impurities can be removed in a simple manner.

That is, in the period during which the speed of the drain motor 630 increases, when the drain channel BUR is clogged even after the drain motor 630 repeatedly rotates and stops in the first direction, the main controller 210 may control the drain motor 630 to repeatedly rotate and stop in the second direction opposite to the first direction, and when the drain channel BUR is clogged even after the drain motor 630 repeatedly rotates and stops in the second direction, the main controller 210 may control the drain motor 630 to repeatedly rotate and stop in the first direction again.

Meanwhile, in the period during which the speed of the drain motor 630 increases, when a start-up failure occurs, the main controller 210 may control the drain motor 630 to be driven to change a rotation direction thereof.

For example, in the period during which the speed of the drain motor 630 increases, when the start-up failure occurs, the main controller 210 may control the drain motor 630 to be repeatedly turned on and off in the first direction in a first number of times, and to be repeatedly turned on and off in the second direction opposite to the first direction in a second number of times by changing the rotation direction of the drain motor 630. Accordingly, when impurities are introduced into the drain pump 141, the impurities can be removed in a simple manner.

Meanwhile, after changing the rotation direction, when the start-up failure occurs again, the main controller 210 may control the motor 630 to change the rotation direction of the motor again. Accordingly, when impurities are introduced into the drain pump 141, the impurities can be removed in a simple manner.

Meanwhile, after changing the rotation direction, even when the start-up failure does not occur, the main controller 210 may control the motor 630 to change the rotation direction of the motor again. This is because the drain pump 141 is in the volute-type structure as described with reference to FIGS. 8 and 9. Accordingly, drainage can be performed smoothly, while removing impurities in a simple manner when the impurities are introduced into the drain pump 141.

Meanwhile, during drainage, in the period during which the speed of the motor 630 increases, if the predetermined period of time elapses in a state where the current speed of the drain motor 630 does not reach the target speed, the main controller 210 may determine that the motor 630 has failed to start up and control the motor 630 to change the rotation direction of the motor. Accordingly, when impurities are introduced into the drain pump 141, the impurities can be removed in a simple manner.

Meanwhile, when the rotation direction of the motor 630 is changed, the main controller 210 may control the motor 630 to operate back to the alignment period Pon and the open loop control period Pop.

Meanwhile, the main controller 210 may control the drain motor 630 such that a power consumed by the drain motor 630 when the drain motor 630 rotates and stops in the first direction is different from that consumed by the drain motor 630 when the drain motor 630 rotates and stops in the second direction.

For example, the main controller 210 may set the power consumed by the drain motor 630 when the drain motor 630 rotates and stops in the first direction to be greater than that consumed by the drain motor 630 when the drain motor 630 rotates and stops in the second direction.

Meanwhile, a level of a current flowing in the drain motor 630 when the drain motor 630 rotates in the first direction is preferably greater than that of a current flowing in the drain motor 630 when the drain motor 630 rotates in the second direction. This is because the drain pump 141 is in the volute-type structure as described with reference to FIGS. 8 and 9.

In particular, in a state where a level of a rotation speed in the first direction is the same as a level of a rotation speed in the second direction, the level of the current flowing in the drain motor 630 when the drain motor 630 rotates in the first direction is preferably greater than that of the current flowing in the drain motor 630 when the drain motor 639 rotates in the second direction. This is because the drain pump 141 is in the volute-type structure as described with reference to FIGS. 8 and 9.

FIG. 13B illustrates that after the motor 630 repeatedly rotates at the speed of W1 and stops four times in the first direction, i.e. clockwise CW, in period Pia1, the impurities are removed and the speed of the motor 630 increases shortly to the target speed W2.

That is, when the clogged drain channel BUR is unclogged during the repeated rotation and stop of the drain motor 630 in the first direction, the main controller 210 may increase the speed of the drain motor 630 in the first direction without rotating and stopping the drain motor 630 in the second direction. Accordingly, when impurities are introduced into the drain pump 141, the impurities can be removed in a simple manner.

FIG. 13C illustrates that after the motor 630 repeatedly rotates at the speed of W1 and stops five times in the first direction, i.e. clockwise CW, in the period Pia, and the motor 630 repeatedly rotates at the speed of −W1 and stops four times in the second direction, i.e. counterclockwise CCW, in period Pib1, the impurities are removed and the speed of the motor 630 increases shortly to the target speed W2.

In this case, when the speed of the motor 630 increases to the target speed W2, the rotation direction of the motor is preferably the first direction.

That is, when the clogged drain channel BUR is unclogged during the repeated rotation and stop of the drain motor 630 in the second direction, the main controller 210 may increase the speed of the drain motor 630 by rotating the drain motor 630 in the first direction. Accordingly, when impurities are introduced into the drain pump 141, the impurities can be removed in a simple manner.

FIG. 13D illustrates that after the motor 630 repeatedly rotates at the speed of W1 and stopped five times in the first direction, i.e. clockwise CW, in the period Pia, the motor 630 repeatedly rotates at the speed of −W1 and stopped five times in the second direction, i.e. counterclockwise CCW, in the period Pib, the motor 630 repeatedly rotates at the speed of W1 and stopped five times in the first direction, i.e. clockwise CW, again in period Piaa, and the motor 630 repeatedly rotates at the speed of −W1 and stopped five times in the second direction, i.e. counterclockwise CCW, in period Piba, the impurities are removed and the speed of the motor 630 increases shortly to the target speed W2.

In this case, when the speed of the motor 630 increases to the target speed W2, the rotation direction of the motor is preferably the first direction.

That is, when the drain channel BUR is clogged even after the motor 630 repeatedly rotates and stops in the first direction and repeatedly rotates and stops in the second direction, the main controller 210 may control the motor 630 to repeatedly rotate and stop in the first direction and repeatedly rotate and stop in the second direction again. Accordingly, when impurities are introduced into the drain pump 141, the impurities can be removed in a simple manner.

(a) of FIG. 14 is a view illustrating waveforms of the output current io flowing in the motor 630 in the periods Pia, Pib, and Pic of FIGS. 13A, and (b) of FIG. 14 is a view illustrating waveforms of the power Pou consumed by the motor 630 in the periods Pia, Pib, and Pic of FIG. 13.

Referring to FIG. 14, it can be seen that a level of an output current in the period Pia during which the motor 630 rotates in the first direction is greater than that of an output current in the period Pib during which the motor 630 rotates in the second direction.

Meanwhile, the main controller 210 may control the power of the motor 630 to be constant as Paa in the period Pia during which the motor 630 rotates in the first direction, to be constant as Pab smaller than Paa in the period Pib during which the motor 630 rotates in the second direction, and to be constant as Pac greater than Paa in the period Pic during which the speed of the motor 630 increases.

Based on such power control, the stability of the converter 410 can be improved as well as removal of impurities when the impurities are introduced into the drain pump 141.

Meanwhile, FIG. 1 illustrates a top loading type machine as a laundry treatment machine, but the drain pump driving apparatus 620 according to an embodiment of the present disclosure may also be applied to a front loading type machine, that is, a drum type machine.

Meanwhile, the drain pump driving apparatus 620 according to an embodiment of the present disclosure may be applied to various machines such as dishwashers and air conditioners, in addition to the laundry treatment machine 100.

The drain pump driving apparatus and the laundry treatment machine including the same according to embodiments of the present disclosure are not limited to the configurations and methods of the above-described embodiments, and various modifications to the embodiments may be made by selectively combining all or some of the embodiments.

Meanwhile, a method for operating the drain pump driving apparatus and the laundry treatment machine according to the present disclosure can be implemented with processor-readable codes in a processor-readable recording medium provided for each of the drain pump driving apparatus and the laundry treatment machine. The processor-readable recording medium includes all kinds of recording devices for storing data that is readable by a processor.

It will be apparent that, although the preferred embodiments of the present disclosure have been illustrated and described above, the present disclosure is not limited to the above-described specific embodiments, and various modifications can be made by those skilled in the art without departing from the gist of the present disclosure as claimed in the appended claims. The modifications should not be understood separately from the technical spirit or prospect of the present disclosure.

What is claimed is:

1. A drain pump driving apparatus comprising:
   a drain pump including a water introduction part for introducing water, a chamber connected to the water introduction part, an impeller disposed within the chamber, a motor disposed on an opposite side of the impeller as compared to the water introduction part, and a water discharge part for discharging water and connected to one side of the chamber, wherein the water discharge part is formed in a direction normal to the chamber;
   a converter to output a direct current (DC) voltage;
   an inverter to convert the DC voltage from the converter into an alternating current (AC) voltage based on a switching operation and to output the converted AC voltage to the motor; and
   a controller configured to:
      control the motor to, when a drain channel between the water introduction part and the water discharge part in the drain pump is clogged, be temporarily stopped in a period during which a speed of the motor increases and then to repeatedly rotate and stop in a first direction which is the same as a start-up direction, and
      control the motor to repeatedly rotate and stop in a second direction opposite to the first direction when the drain channel between the water introduction part and the water discharge part in the drain pump is clogged even after the motor repeatedly rotates and stops in the first direction,
   wherein, when the drain channel between the water introduction part and the water discharge part in the drain pump is unclogged by repeatedly rotating and stopping the motor in the second direction, the controller is configured to increase the speed of the motor in the first direction as when the drain channel between the water introduction part and the water discharge part in the drain pump is unclogged by repeatedly rotating and stopping the motor in the first direction,
   wherein, in a period during which a speed of the motor increases, if a predetermined period of time elapses in a state in which a current speed of the motor does not reach a target speed, the controller controls the motor to change a rotation direction of the motor.

2. The drain pump driving apparatus of claim 1, wherein, when the clogged drain channel between the water introduction part and the water discharge part in the drain pump is unclogged during the repeated rotation and stop of the motor in the first direction, the controller increases the speed of the motor in the first direction without rotating and stopping the motor in the second direction.

3. The drain pump driving apparatus of claim 1, wherein, when the clogged drain channel between the water introduction part and the water discharge part in the drain pump is unclogged during the repeated rotation and stop of the motor in the second direction, the controller increases the speed of the motor to the target speed by rotating the motor in the first direction, and
   after increasing the speed of the motor to the target speed, the controller controls the drain motor to be supplied with a constant power.

4. The drain pump driving apparatus of claim 1, wherein the controller controls the motor to differentiate a power consumed by the motor when the motor rotating and stopping in the first direction from a power consumed by the motor when the motor rotates and stops in the second direction.

5. The drain pump driving apparatus of claim 1, wherein, when the drain channel between the water introduction part and the water discharge part in the drain pump is clogged even after the motor repeatedly rotates and stops in the second direction, the controller controls the motor to be repeatedly rotate and stop in the first direction.

6. The drain pump driving apparatus of claim 1, wherein a level of a current flowing in the motor when the motor rotates in the first direction is greater than a level of a current flowing in the motor when the motor rotates in the second direction.

7. The drain pump driving apparatus of claim 1, wherein, after changing the rotation direction of the motor, the controller controls the motor to change the rotation direction of the motor again.

8. A drain pump driving apparatus comprising:
   a drain pump including a water introduction part for introducing water, a chamber connected to the water introduction part, an impeller disposed within the chamber, a motor disposed on an opposite side of the impeller as compared to the water introduction part, and a water discharge part for discharging water and connected to one side of the chamber, wherein the water discharge part is formed in a direction normal to the chamber;
   a converter to output a direct current (DC) voltage;
   an inverter to convert the DC voltage from the converter into an alternating current (AC) voltage based on a switching operation and to output the converted AC voltage to the motor; and
   a controller configured to:
      control the motor to, when a drain channel between the water introduction part and the water discharge part in the drain pump is clogged, be temporarily stopped in a period during which a speed of the motor increases and then to repeatedly rotate and stop in a first direction which is the same as a start-up direction, and
      control the motor to repeatedly rotate and stop in a second direction opposite to the first direction when the drain channel between the water introduction part and the water discharge part in the drain pump is clogged even after the motor repeatedly rotates and stops in the first direction,
   wherein, when the drain channel between the water introduction part and the water discharge part in the drain pump is unclogged by repeatedly rotating and stopping the motor in the second direction, the controller is configured to increase the speed of the motor in the first direction as when the drain channel between the water introduction part and the water discharge part in the drain pump is unclogged by repeatedly rotating and stopping the motor in the first direction,
   wherein, in a period during which a speed of the motor increases, if a predetermined period of time elapses in a state in which a current speed of the motor does not reach a target speed, the controller controls the motor to be repeatedly turned on and off in the first direction for a first number of times, and to be repeatedly turned on and off in the second direction opposite to the first direction for a second number of times by changing a rotation direction of the motor.

9. A laundry treatment machine comprising:
   a washing tub;
   a driver for driving the washing tub;
   a drain pump including a water introduction part for introducing water, a chamber connected to the water introduction part, an impeller disposed within the chamber, a motor disposed on an opposite side of the impeller as compared to the water introduction part, and a water discharge part for discharging water and connected to one side of the chamber, wherein the water discharge part is formed in a direction normal to the chamber; and
   a drain pump driving apparatus to drive the drain pump, wherein the drain pump driving apparatus includes:
      a converter to output a direct current (DC) voltage;
      an inverter to convert the DC voltage from the converter into an alternating current (AC) voltage based on a switching operation and to output the converted AC voltage to the motor; and
      a controller configured to:
         control the motor to, when a drain channel between the water introduction part and the water discharge part in the drain pump is clogged, be temporarily stopped in a period during which a speed of the motor increases and then to repeatedly rotate and stop in a first direction which is the same as a start-up direction, when the drain channel between the water introduction part and the water discharge part in the drain pump is clogged, and
         control the motor to repeatedly rotate and stop in a second direction opposite to the first direction when the drain channel between the water introduction part and the water discharge part in the drain pump is clogged even after the motor repeatedly rotates and stops in the first direction, and
      wherein when the drain channel between the water introduction part and the water discharge part in the drain pump is unclogged by repeatedly rotating and stopping the motor in the second direction, the controller is configured to increase the speed of the motor in the first direction as when the drain channel between the water introduction part and the water discharge part in the drain pump is unclogged by repeatedly rotating and stopping the motor in the first direction,
      wherein, in a period during which the speed of the motor increases, if a predetermined period of time elapses in a state in which a current speed of the motor does not reach a target speed, the controller controls the motor to change a rotation direction of the motor.

10. The laundry treatment machine of claim 9, wherein, when the clogged drain channel between the water introduction part and the water discharge part in the drain pump is unclogged during the repeated rotation and stop of the motor in the second direction, the controller increases the speed of the motor to the target speed by rotating the motor in the first direction, and
   after increasing the speed of the motor to the target speed the controller controls the drain motor to be supplied with a constant power.

11. The laundry treatment machine of claim 9, wherein the controller controls the motor to differentiate a power consumed by the motor when the motor rotates and stops in the first direction from a power consumed by the motor when the motor rotates and stops in the second direction.

12. The laundry treatment machine of claim 9, wherein, when the drain channel between the water introduction part and the water discharge part in the drain pump is clogged even after the motor repeatedly rotates and stops in the second direction, the controller controls the motor to repeatedly rotate and stop in the first direction.

13. The laundry treatment machine of claim 9, wherein a level of a current flowing in the motor when the motor rotates in the first direction is greater than a level of a current flowing in the motor when the motor rotates in the second direction.

14. The laundry treatment machine of claim 9, wherein, in a period during which the speed of the motor increases, if the predetermined period of time elapses in a state in which a current speed of the motor does not reach a target speed, the controller controls the motor to be repeatedly turned on and off in the first direction for a first number of times, and to be repeatedly turned on and off in the second direction opposite to the first direction for a second number of times by changing a rotation direction of the motor.

* * * * *